US009367575B1

(12) United States Patent
Bromley et al.

(10) Patent No.: US 9,367,575 B1
(45) Date of Patent: Jun. 14, 2016

(54) SYSTEM AND METHOD FOR MANAGING DEDUPLICATION BETWEEN APPLICATIONS USING DISSIMILAR FINGERPRINT TYPES

(71) Applicant: Symantec Corporation, Mountain View, CA (US)

(72) Inventors: Graham Bromley, Dublin, CA (US); Kalyani Sundaralingam, Campbell, CA (US)

(73) Assignee: Veritas Technologies LLC, Mountain View, CA (US)

( * ) Notice: Subject to any disclaimer, the term of this patent is extended or adjusted under 35 U.S.C. 154(b) by 178 days.

(21) Appl. No.: 13/930,719

(22) Filed: Jun. 28, 2013

(51) Int. Cl.
*G06F 7/00* (2006.01)
*G06F 17/30* (2006.01)

(52) U.S. Cl.
CPC ............................... *G06F 17/30321* (2013.01)

(58) Field of Classification Search
CPC ................... G06F 17/30321; G06F 17/30424; G06F 17/30336; G06F 17/30619; G06F 17/30864
USPC .......................................................... 707/741
See application file for complete search history.

(56) References Cited

U.S. PATENT DOCUMENTS

| 8,341,528 | B2 | 12/2012 | Chaudhary et al. ............ 715/732 |
| 8,463,742 | B1* | 6/2013 | Floyd ................. G06F 17/30156 707/609 |
| 2010/0312800 | A1* | 12/2010 | Lumb .................... G06F 3/0608 707/796 |
| 2011/0099154 | A1* | 4/2011 | Maydew ........... G06F 17/30156 707/692 |
| 2011/0225191 | A1* | 9/2011 | Xie .................... G06F 17/30631 707/775 |
| 2011/0238635 | A1* | 9/2011 | Leppard ............ G06F 17/30159 707/693 |
| 2012/0030477 | A1* | 2/2012 | Lu ........................ G06F 11/1458 713/189 |
| 2012/0158670 | A1* | 6/2012 | Sharma ................. G06F 3/0608 707/692 |
| 2012/0191667 | A1* | 7/2012 | Kopylovitz ........... G06F 3/0608 707/692 |
| 2012/0233135 | A1* | 9/2012 | Tofano .............. G06F 17/30489 707/692 |
| 2012/0303595 | A1* | 11/2012 | Liu ...................... G06F 11/1453 707/692 |
| 2013/0018854 | A1* | 1/2013 | Condict ................ G06F 3/0608 707/692 |
| 2013/0086005 | A1* | 4/2013 | Mori .................. G06F 17/30327 707/690 |
| 2013/0097380 | A1* | 4/2013 | Colgrove .......... G06F 17/30159 711/118 |

* cited by examiner

*Primary Examiner* — Hosain Alam
*Assistant Examiner* — Nicholas Allen
(74) *Attorney, Agent, or Firm* — Campbell Stephenson LLP

(57) ABSTRACT

The present disclosure provides for a fingerprint service that maintains a fingerprint index configured to support a number of dissimilar fingerprint types. In one embodiment, the fingerprint service receives a lookup request, where the lookup request comprises one or more fingerprint descriptors, and each of the one or more fingerprint descriptors comprises a fingerprint value and a corresponding fingerprint type. A first fingerprint descriptor of the one or more fingerprint descriptors is identified. A first sub-index of a fingerprint index is selected, where the first sub-index is associated with a first fingerprint type of the first fingerprint descriptor. A lookup operation for a first fingerprint value of the first fingerprint descriptor is performed in the first sub-index. In response to the first fingerprint value being present in the first sub-index, information associated with the first fingerprint value is returned.

21 Claims, 12 Drawing Sheets

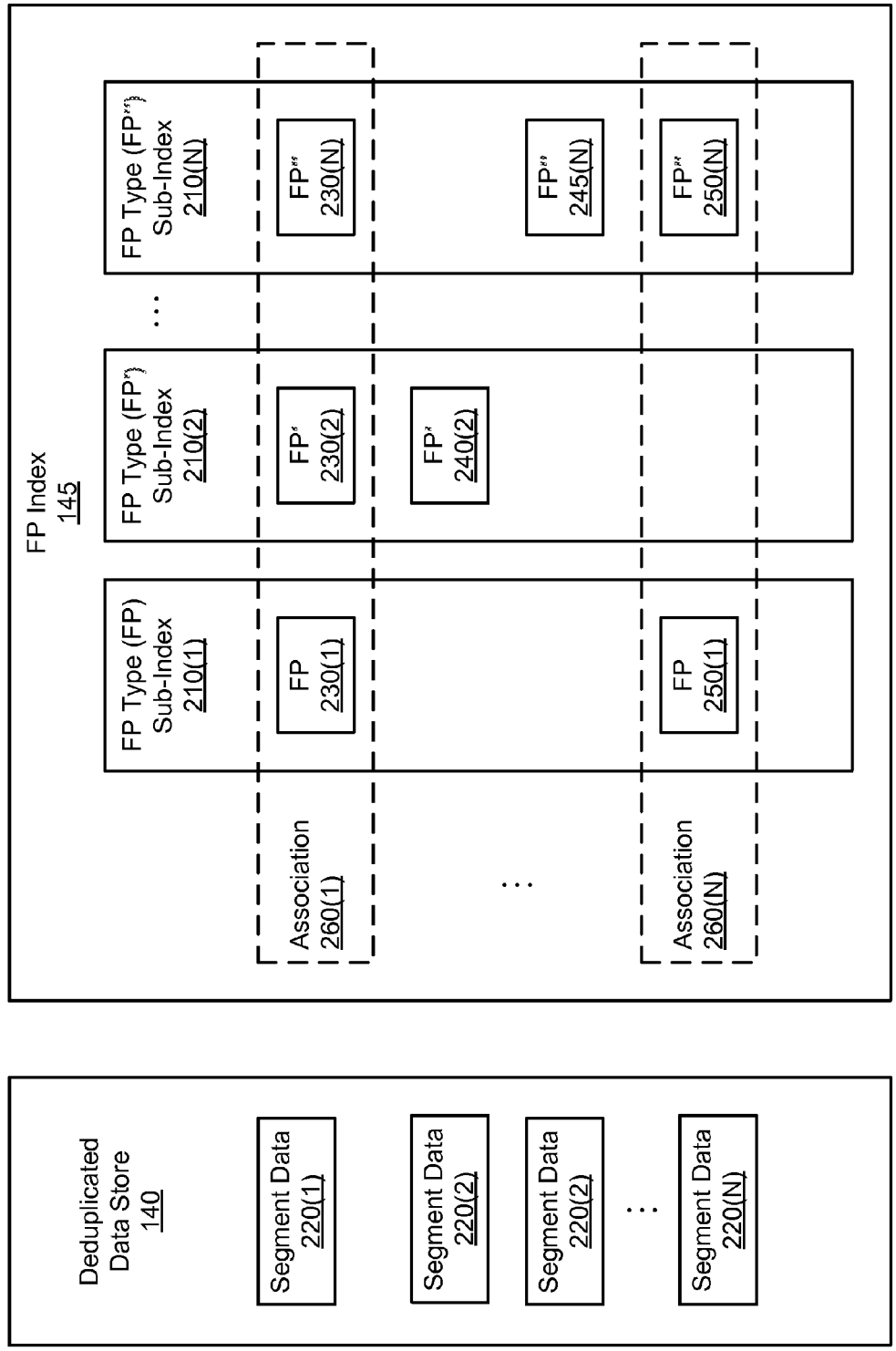

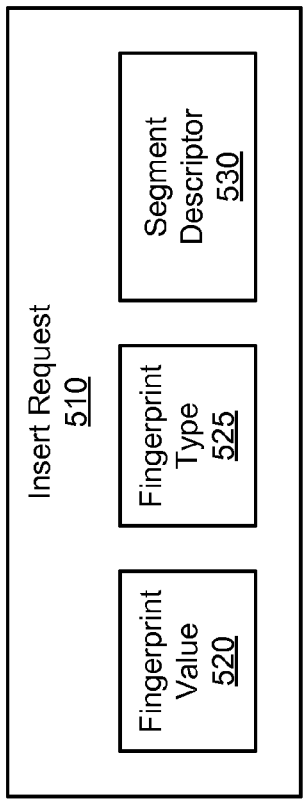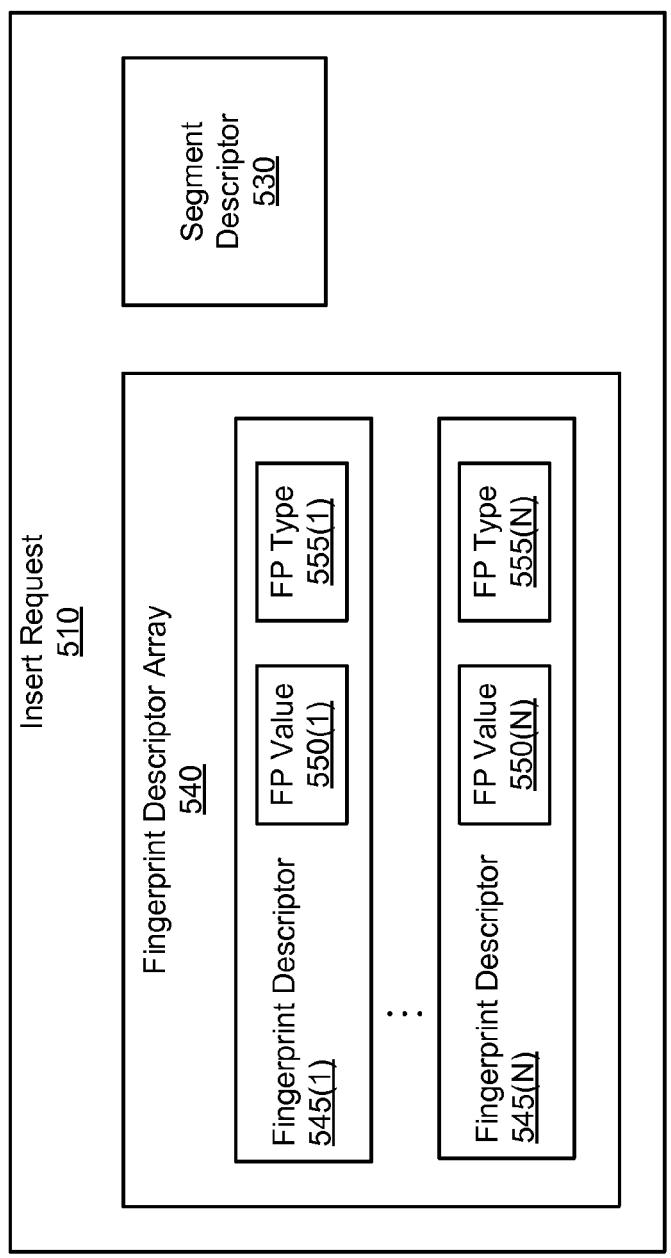

SYSTEM AND METHOD FOR MANAGING DEDUPLICATION BETWEEN APPLICATIONS USING DISSIMILAR FINGERPRINT TYPES

FIELD OF THE INVENTION

The present disclosure relates to performing deduplication operations, and more particularly, to maintaining a fingerprint service that supports dissimilar fingerprint types.

BACKGROUND

An ever-increasing reliance on information and computing systems that produce, process, distribute, and maintain such information in its various forms, continues to put great demands on techniques for providing data storage and access to that data storage. Business or enterprise organizations can produce and retain large amounts of data. While data growth is not new, the pace of data growth has become more rapid, the location of data more dispersed, and linkages between data sets more complex.

An enterprise organization can implement a scheme to protect data located on various computing devices of the organization. An enterprise organization may use a number of disparate software applications directed to managing such data. However, certain interactions between the software applications may not be supported, such as when the software applications use different functionalities that are incompatible with one another. The enterprise organization may not discover this incompatibility until after some functionality is needed, such as during migration of data, where the incompatibility may possibly cause the enterprise organization to lose data.

BRIEF DESCRIPTION OF THE DRAWINGS

The present invention may be better understood, and its numerous objects, features and advantages made apparent to those skilled in the art by referencing the accompanying drawings.

FIGS. 2A and 2B are simplified block diagrams illustrating components of an example fingerprint index in which the present disclosure can be implemented, according to one embodiment.

FIGS. 5A and 5B are simplified block diagrams illustrating components of an example insert request message, according to one embodiment.

Figure 1:
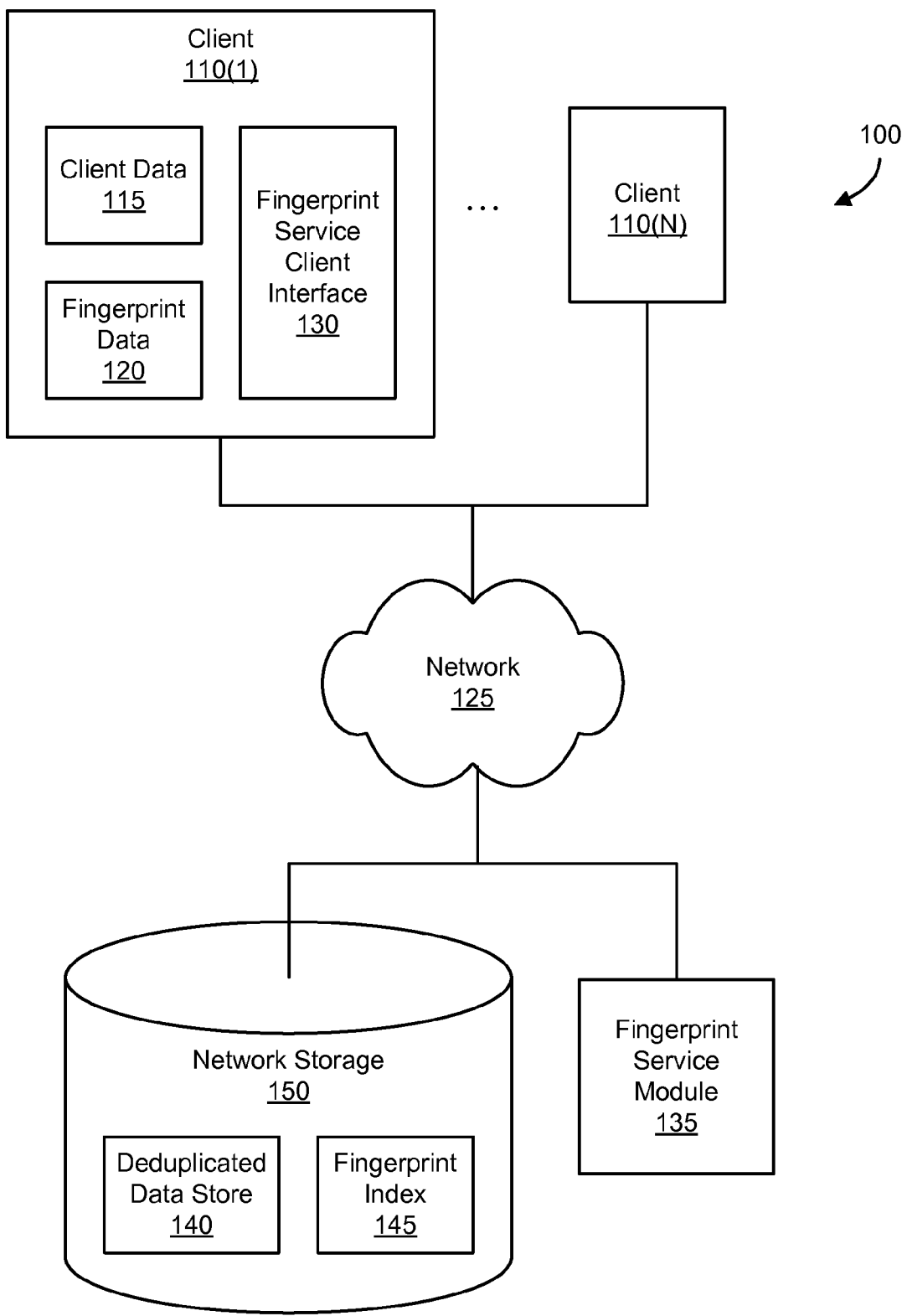
FIG. 1 is a simplified block diagram illustrating components of an example system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

The present disclosure provides for a fingerprint service that maintains a fingerprint index configured to support a number of dissimilar fingerprint types. In one embodiment, the fingerprint service receives a lookup request, where the lookup request comprises one or more fingerprint descriptors, and each of the one or more fingerprint descriptors comprises a fingerprint value and a corresponding fingerprint type. A first fingerprint descriptor of the one or more fingerprint descriptors is identified. A first sub-index of a fingerprint index is selected, where the first sub-index is associated with a first fingerprint type of the first fingerprint descriptor. A lookup operation for a first fingerprint value of the first fingerprint descriptor is performed in the first sub-index. In response to the first fingerprint value being present in the first sub-index, information associated with the first fingerprint value is returned.

Example Embodiments

FIG. 1 is a simplified block diagram illustrating components of an example system 100 (such as a backup and/or deduplication system) in which the present disclosure can be implemented. System 100 includes a network 125 that communicatively couples one or more client systems 110(1)-(N), a fingerprint (FP) service module 135, and network storage 150. Each component is discussed in further detail below.

One or more client systems 110(1)-(N), also referred to herein as client device(s) 110 and/or client(s) 110, can be implemented using, for example, a desktop computer, a laptop computer, a workstation, a server, or the like. An example of such computing devices is described subsequently, in connection with FIG. 9. Client systems 110(1)-(N) each store client data 115, fingerprint data 120, and a fingerprint (FP) client interface module 130. An enterprise (e.g., a business organization) may include a number of client systems 110(1)-(N) that are associated with the enterprise and are also communicatively coupled to one another, as well as communicatively coupled to network 125. One or more enterprises may be implemented in system 100.

Client data 115 can include various data that is generated and/or consumed by applications employed by a user of a client system. Client data 115 can also include executable files, such as those used to implement applications and operating systems, as well as files that are used or generated by such executable files. Client data 115 can include files generated by user applications (e.g., word processing programs, email programs, graphics programs, a database application, or the like) executing on a client system. Each client system can store different client data 115 in storage that is local to the respective client system.

A variety of tasks related to backup services and/or deduplication services can be implemented in system 100 as one or more client-server applications (not shown). Certain functions of the backup and/or deduplication services can be performed by components of a backup application and/or a deduplication application, respectively, such as by a server component (e.g., residing on one or more servers in system 100) and a client component (e.g., residing on client system 110). The functions may be divided between the components, or may be performed completely by one component or the other, depending on the implementation of the backup application and/or deduplication application.

Backup services store a copy of client data (also referred to as a backup) in a designated storage area, such as in a backup storage area in network storage 150. Tasks related to backup services include initiating a backup process on one or more client systems, tracking backups of the one or more client systems, managing resources (e.g., storage devices) storing the backups, and maintaining metadata related to backups (e.g., related to files and other information backed up from file systems associated with the one or more client systems).

Deduplication services help reduce an amount of storage needed to store backups of enterprise data (e.g., client data stored on various ones of enterprise client systems) by providing a mechanism for storing a piece of information only once. Thus, in a backup context, if a piece of information is stored in multiple locations within system 100 (e.g., a common piece of client data is stored on multiple ones of enterprise client systems), that piece of information can (ideally) be stored once in a deduplicated backup storage area, such as deduplicated data store 140 in network storage 150. Also, if the piece of information does not change between a first point in time (e.g., a first backup or a first version of a file) and a second point in time (e.g., a second backup or a second version of a file), then that piece of information need not be stored during a second backup process, as long as that piece of information continues to be stored in the deduplicated backup storage area. Data deduplication can also be employed outside of the backup context, thereby reducing the amount of active storage occupied by duplicate files or data (e.g., reduces the amount of client data that needs to be stored at the clients).

In order to perform data deduplication, a system needs to be able to identify redundant copies of the same data. One way that can provide a reasonable likelihood of finding duplicated instances of data is to divide file data into consistently-sized segments, which are analyzed for duplication in the deduplicated data store. Thus, if only a portion of a large file is modified, then only the segment of data corresponding to that portion of the file need be stored in deduplicated data store 140. The remainder of the segments need not be stored again in deduplicated data store 140. In one embodiment, a file (e.g., a backup) can be divided into a plurality of fixed-size segments. In another embodiment, a file can be divided into a plurality of variable-sized segments.

Copies of one or more segments of client data 115 may be transferred to network storage 150 via network 125 for inclusion in deduplicated data store 140 (e.g., segments stored as part of a backup in the deduplicated data store). Deduplicated data store 140 is configured to store data of segments (also referred to as segment data) that are received from one or more client systems 110(1)-(N) in system 100. Each client system can send copies of different client data 115 to network storage 150. During a deduplication process for storing client data 115 (e.g., backing up a file or segments of client data) in deduplicated data store 140, client 110 can be configured to determine which segments of client data 115 are already stored in deduplicated data store 140. Rather than compare a segment itself to each segment stored in deduplicated data store 140 (which can be enormously time- and processing-prohibitive), identifiers of segments, or fingerprints, can be compared to determine whether a given segment is already stored in deduplicated data store 140. A fingerprint engine is configured to generate fingerprints that identify various segments or pieces of client data 115, where such fingerprints are illustrated as fingerprint data 120. Client 110 can host a deduplication client component that is configured with a fingerprint engine and/or client 110 can be configured to communicate with a deduplication server component that is configured with a fingerprint engine. Fingerprint data 120 is discussed in further detail below, in connection with FIGS. 2A and 2B.

A fingerprint index can be available in the network, where the fingerprint index contains fingerprints corresponding to segments stored in deduplicated data store 140. Typically, such a conventional fingerprint index is configured to support one type of fingerprint, such as fingerprints generated using a SHA (Secure Hash Algorithm) or MD (Message Digest) algorithm. A fingerprint algorithm is configured to generate a same fingerprint for identical segments and different fingerprints for different segments of client data. Client 110 (or a backup and/or deduplication application or component hosted on client 110) can determine whether a segment of client data is already stored in deduplicated data store 140 by comparing the segment's fingerprint, which is generated using one particular algorithm, with fingerprints in the fingerprint index, which are also generated using the same algorithm.

Different fingerprint algorithms are independent from one another and produce different types of fingerprints because the different algorithms use (largely) different mathematical computations. For example, a first fingerprint generated for a segment using a first fingerprint algorithm (or a fingerprint of a first fingerprint type) will be different from a second fingerprint generated for the same segment using a second fingerprint algorithm (or a fingerprint of a second fingerprint type). A client that uses one fingerprint type cannot deduplicate its client data using a fingerprint index that only supports a different fingerprint type because the fingerprints of the first fingerprint type will not match any fingerprints of the second fingerprint type, even if there exists a fingerprint of the second fingerprint type that identifies the same segment. A fingerprint of a first fingerprint type also cannot be converted or "reverse engineered" into a fingerprint of a second fingerprint type. In other words, it is not possible to deduplicate client data by comparing fingerprints of one fingerprint type with fingerprints of another fingerprint type.

Thus, a fingerprint index that only supports a single fingerprint type limits deduplication to the single fingerprint type. Clients that use such a fingerprint index are limited to deduplicating their client data against deduplicated data that is identified by fingerprints of the single fingerprint type (e.g., comparing client data fingerprints with deduplicated data fingerprints to determine if the client data is already stored in deduplicated data store). Such a fingerprint index also limits deduplication to those clients that can generate fingerprints of the single fingerprint type (e.g., those clients that have access to a fingerprint engine configured to generate fingerprints using the single fingerprint algorithm). Such a deduplication scheme is commonly implemented in offices, where deduplication is limited to the clients located in a single office that share a particular fingerprint algorithm (even though a single enterprise may include a large number of offices). Deduplication performed in such a setting can be viewed as local in nature, where such deduplication is performed within a "deduplication island."

However, as advances are made in fingerprint algorithms (e.g., algorithms that are more secure against attack), clients may no longer wish to use an older fingerprint algorithm and may upgrade to a different (e.g., newer or more secure) fingerprint algorithm. In such a scenario, all deduplicated data would need to be re-fingerprinted (e.g., generate new fingerprints for the deduplicated data using the new fingerprint algorithm) and a new fingerprint index that supports the new fingerprint type would need to be created. Such an upgrade would be time- and resource-prohibitive. Further, the entire process would need to be repeated each time the fingerprint algorithm was upgraded.

The present disclosure provides for a fingerprint service that maintains a fingerprint index 145 configured to support a number of dissimilar fingerprint types. Rather than store fingerprints of a single fingerprint type, fingerprint index 145 is configured to store fingerprints of different fingerprint types, where the stored fingerprints correspond to the segments stored in deduplicated data store 140. Fingerprint index 145 can also be configured to store associations between one or more fingerprints of different fingerprint types, where the one or more fingerprints correspond to a single segment. Fingerprint index 145 thus provides a central repository of fingerprints of differing fingerprint types that can be used by various clients to perform deduplication. Fingerprint index 145 can be implemented in network storage 150. Fingerprint index 145 is discussed in further detail below in connection with FIGS. 2A and 2B.

Fingerprint (FP) service module 135 is configured to provide access to fingerprint index 145 to one or more client systems 110(1)-(N). FP service module 135 can be implemented on a computing device in network 125, such as a server. An example of such a computing device is described subsequently, in connection with FIG. 9. One or more client systems 110(1)-(N) can communicate with FP service module 135 via a fingerprint (FP) service client interface 130 in order to request the fingerprint service (e.g., request a lookup for a fingerprint or request that a fingerprint be inserted into the fingerprint index). FP service client interface 130 is configured to establish a connection with FP service module 135, where one or more messages (e.g., requests and responses) are transmitted between FP service client interface 130 and FP service module 135 across network 125. Examples of network 125 include a local area network (LAN) utilizing Ethernet, IEEE 802.11x, or some other communications protocol, a wide area network (WAN) such as the Internet, a communications channel, and the like. FP service client interface 130 and FP service module 135 are discussed in further detail below in connection with FIG. 3.

Fingerprint index 145 can be utilized in at least two deduplication scenarios. In one scenario, clients perform deduplication within the particular fingerprint type used by the respective client, where fingerprint index 145 supports the different fingerprint types. For example, a first client uses a first fingerprint type and a second client uses a second (different) fingerprint type. While each client is limited to performing deduplication within their respective fingerprint type, fingerprint index 145 is configured to store both fingerprint types without creating any association between the fingerprints of the different fingerprint types. Thus, fingerprint index 145 can be viewed as hosting a number of (independent) sub-indexes that each store fingerprints of a particular fingerprint type.

In such a scenario, multiple enterprises (or multiple offices of a single enterprise) that use the fingerprint service can implement a particular and/or proprietary fingerprint type. Since each enterprise (or office) uses a separate and distinct fingerprint type, inter-enterprise (or inter-office) deduplication can be prevented (e.g., limit each enterprise or office to deduplicating against their own enterprise/office data identified by their respective particular and/or proprietary fingerprint type), as long as each enterprise (or office) uses only their particular and/or proprietary fingerprint type. Thus, in such a scenario, deduplicated data store 140 would become a central repository for deduplicated data, where each enterprise (or office) would have their own sub-store of deduplicated enterprise (or office) data.

In another scenario, clients perform deduplication across multiple fingerprint types supported by fingerprint index 145, where associations are created among fingerprints (of different fingerprint types) that identify a same segment. For example, a client that uses a first fingerprint type and a second fingerprint type can perform deduplication across the first and second fingerprint types. The client can request a lookup for two (or more) fingerprints of the two (or more) different fingerprint types, where the two (or more) fingerprints identify the same segment and are associated with one another in fingerprint index 145. Fingerprint index 145 performs a lookup of each requested fingerprint until it finds a match of one of the requested fingerprints. Thus, a client can improve its deduplication rate (e.g., improve its hit rate or probability of finding a matching fingerprint in fingerprint index) by searching for more than one fingerprint in fingerprint index 145.

In such a scenario, since fingerprint index 145 supports a number of different fingerprint types, various clients that use at least one of those different fingerprint types can perform deduplication using fingerprint index 145. However, a client that requests a single fingerprint of a particular fingerprint type in this scenario would still be limited to deduplicating data within that particular fingerprint type.

In both scenarios, deduplication need not be limited to clients located within a particular office (or deduplication island), or even to clients located in a single enterprise. Deduplication can be performed by a number of clients that are capable of connecting to the fingerprint service and that also use at least one of the fingerprint types supported by fingerprint index 145. Thus, deduplication using the fingerprint service can be viewed as global in nature. Further, since a greater number of clients are able to perform deduplication using the fingerprint service, a larger amount of client data can be deduplicated. This further avoids unnecessary (client) storage of redundant copies of the same client data.

Fingerprint service module 135 can also update fingerprint index 145 with additional fingerprints of different types. Fingerprint service module 135 can insert one or more fingerprints into fingerprint index 145. Fingerprint service module 135 can also associate fingerprints in fingerprint index 145 (e.g., associate two or more fingerprints with one another), when instructed by client 110 that the fingerprints (of different fingerprint types) should be associated. In one embodiment, fingerprint index 145 can implement an association of fingerprints in the form of an index record, where each index record stores one or more fingerprints of different fingerprint types that identify a same segment.

Network storage 150 can be implemented as network attached storage (NAS), file servers, storage filers, and/or network shares. Network storage 150 can be implemented as a single storage device or as a collection of storage devices. Network storage 150 can also be implemented as a storage area network (SAN), which couples remote storage devices to a server (e.g., a storage server), such that the remote storage devices appear as locally-attached storage devices to the server's operating system (OS), for example. Network storage 150 can be directly attached to FP service module 135 or can be coupled to FP service module 135 via network 125. Network storage 150 can include a data volume or other storage construct.

In light of the present disclosure, it will be appreciated that network storage 150 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, system 100 and network 125 can include other components such as routers, firewalls and the like that are not germane to the discussion of the present disclosure and will not be discussed further herein. It will also be appreciated that other configurations are possible. For example, a larger number of client systems 110(1)-(N) can be implemented in system 100 than the number shown, client systems 110(1)-(N) can be directly coupled to fingerprint service module 135 and/or network storage 150, and so on.

The letter N is used to indicate a variable number of devices or components. For example, a variable number of clients are implemented in system 100. Although the letter N is used in describing a variable number of instances of each of these different devices and components, a repeated use of the letter N does not necessarily indicate that each device and component has a same number of N instances implemented in the deduplication system.

FIG. 2A is a simplified block diagram illustrating components of an example fingerprint index 145 in which the present disclosure can be implemented. Fingerprint index 145 is configured to store fingerprints of a variety of dissimilar fingerprint types, where the stored fingerprints identify segments stored in deduplicated data store 140, illustrated as segment data 220(1)-(N). Ideally, a single copy of a segment is stored in deduplicated, but multiple copies of a segment may be stored, with each copy identified by a fingerprint of a different fingerprint type, as further discussed below. Fingerprint index 145 includes one or more fingerprint (FP) type sub-indexes 210(1)-(N). Each FP type sub-index 210 includes a set of sub-index entries, where the sub-index entries are each configured to store a fingerprint of a respective fingerprint type. For example, FP type sub-index 210(1) can store MD5 fingerprints, FP type sub-index 210(2) can store SHA-1 160 bit fingerprints, FP type sub-index 210 (3) can store SHA-2 256 bit fingerprints, and so on. Each fingerprint type sub-index 210 is also associated with an identifier of the respective fingerprint type, and thus each sub-index can be identified by the respective fingerprint type.

A fingerprint is an identifier of a respective segment stored in deduplicated data store 140. A fingerprint can be a checksum, hash value, or other such value that is calculated based upon data within the segment (e.g., within a file segment of client data). In many embodiments, fingerprints are generated by a fingerprint algorithm in a manner (e.g., using a cryptographically strong, collision-resistant hash function) that produces the same identifier for identical segments, while also producing different identifiers for non-identical segments. Regardless of which particular algorithm or fingerprint type is used to generate fingerprints by a client, the client can use the generated fingerprints to perform deduplication, so long as the fingerprint type is supported by fingerprint index 145. An additional fingerprint type can be supported by fingerprint index 145 by adding (e.g., appending) a new FP type sub-index 210 to fingerprint index 145, where the newly added FP type sub-index 210 is configured to store fingerprints of the additional fingerprint type.

As illustrated, fingerprint FP type sub-index 210(1) stores one or more fingerprints of a first fingerprint type FP in a first set of sub-index entries that includes fingerprints 230(1) and 250(1), fingerprint FP type sub-index 220(2) stores one or more fingerprints of a second fingerprint type FP' in a second set of sub-index entries that includes fingerprints 230(2) and 240(2), and so on. A number of fingerprints of different fingerprint types can identify the same segment, such as fingerprints FP 230(1), FP' 230(2) and FP'' 230(N) that identify segment data 220(1) in deduplicated data store 140. Fingerprints of different fingerprint types that identify a single segment are associated with one another in fingerprint index 145. For example, fingerprints FP 230(1), FP' 230(2) and FP'' 230(N) are associated with one another, illustrated as association 260(1). Such an association is created at the time the fingerprints are added to fingerprint index 145 (or inserted into their respective FP type sub-indexes 210 of fingerprint index 145). If a client is aware that two or more fingerprints identify a same segment, the client can instruct fingerprint index 145 to associate the two or more fingerprints (e.g., to create an association that includes the two or more fingerprints) in order to indicate that the two or more fingerprints identify a same segment. Since the two or more fingerprints identify (and thus correspond to) the same segment, only one copy of the segment need be stored in deduplicated data store 140, thus reducing the amount of storage needed for deduplicated data store 140. Creation of an association is further discussed below in connection to FIG. 2B and FIG. 8.

However, without instruction from the client, fingerprint index 145 cannot determine that two or more fingerprints should be associated and will not create such an association. In one embodiment, fingerprint service module 135 is not configured with a fingerprint engine and thus cannot generate or determine fingerprints of different fingerprint types for a same segment. For example, fingerprints FP' 240(2) and FP'' 245(N) both identify a same segment and are stored in fingerprint index 145 without an association. Since the two or more fingerprints are not associated with one another, a corresponding copy of the segment needs to be stored in deduplicated data store 140 for each (individual) fingerprint, thus creating multiple copies of the segment in deduplicated data store (as illustrated by the duplicate copies of segment data 220(2) in deduplicated data store 140 that are respectively identified by FP' 240(2) and FP'' 245(N)).

Figure 2B:
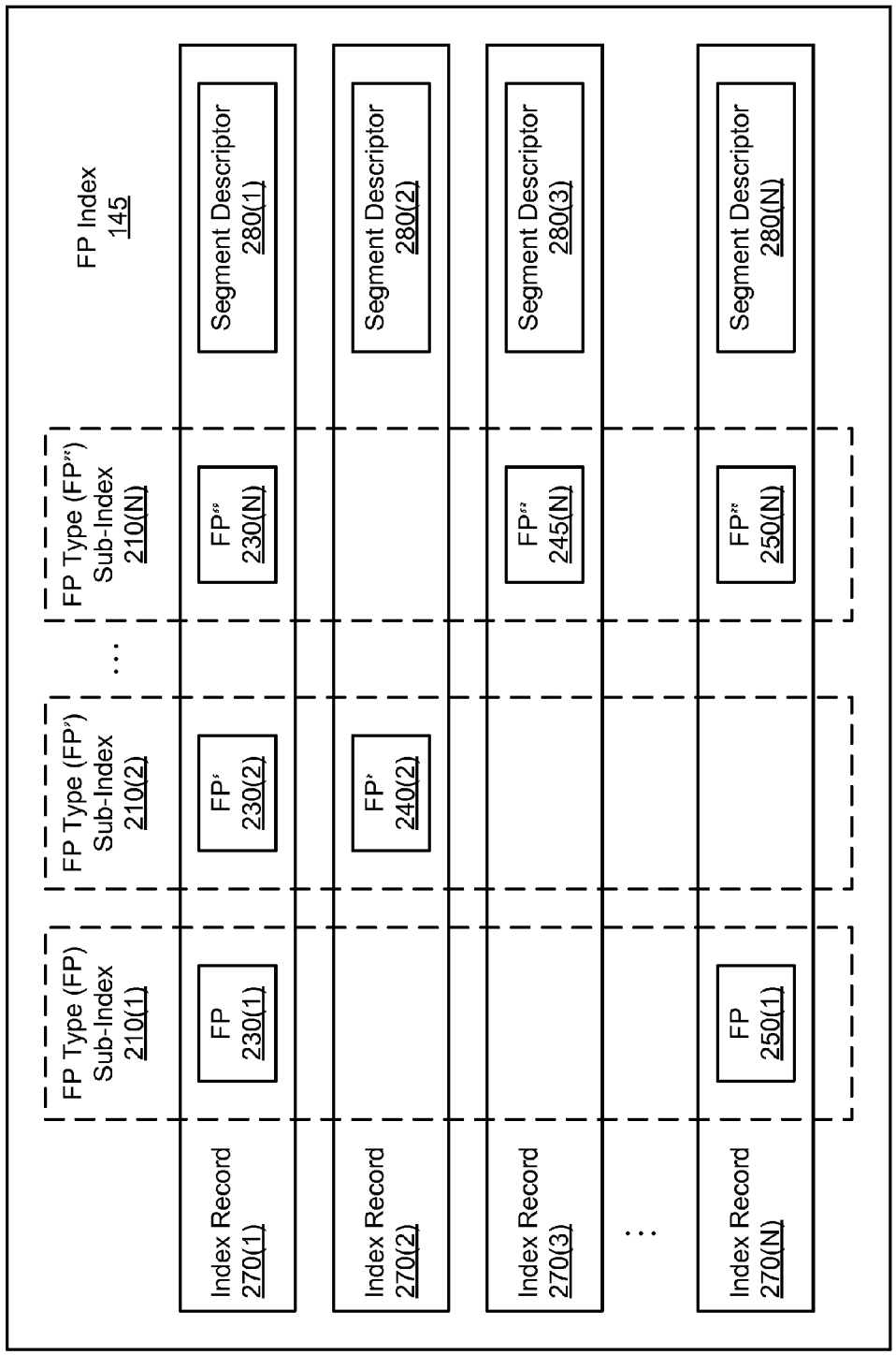

FIG. 2B further illustrates an example fingerprint index 145 in which the present disclosure can be implemented. Associations can be created or formed between fingerprints in fingerprint index 145 in a variety of ways, such as by using one or more pointers to associate fingerprints with one another (e.g., use one or more pointers to associate particular sub-index entries that contain the fingerprints), or by including two or more fingerprints in a single object (e.g., an object or record). While fingerprint index 145 can be implemented using one of various optimized types of indexes (e.g., optimized for performance, scalability, and/or capacity), in one embodiment, fingerprint index 145 can be likened to a relational database that includes a number of records, where each record is keyed to fingerprints of one or more fingerprint types.

As illustrated in FIG. 2B, fingerprint index 145 includes one or more index records 270(1)-(N) that are keyed to one or more FP type sub-indexes 210(1)-(N). Each index record 270 can include up to N sub-index entries, with each sub-index entry corresponding to a respective one of FP type sub-indexes 210(1)-(N) supported in fingerprint index 145. Each index record 270 is configured to include one or more fingerprints of one or more fingerprint types, where the one or more fingerprints (of the single index record) identify a single segment.

An index record can be found (or located) using one or more pairings of a fingerprint and a corresponding fingerprint type, also referred to herein as a fingerprint descriptor. Fingerprint service module 135 can use the given fingerprint type of a fingerprint descriptor to identify the FP type sub-index (and thus identify a set of sub-index entries) in which to search for the given fingerprint of the fingerprint descriptor. Fingerprint service module 135 searches for the given fingerprint in the identified FP type sub-index, such as by comparing the given fingerprint with the fingerprints present in the set of sub-index entries of the identified FP type sub-index. If a matching fingerprint is found (e.g., a fingerprint in a sub-index entry of an index record matches the fingerprint of the fingerprint descriptor), the index record containing the matching fingerprint is determined to correspond to the segment identified by the matching fingerprint. The presence of the located index record (containing the matching fingerprint) in fingerprint index 145 indicates that the corresponding segment is already stored in deduplicated data store 140.

For example, a client may request a lookup for fingerprint 230(2) of the second fingerprint type FP' to determine whether the corresponding segment has already been stored in deduplicated data store 140. The fingerprint service uses FP' to identify FP type sub-index 210(2) (e.g., determine that fingerprint type FP' matches an identifier associated with FP type sub-index 210(2)) and select FP type sub-index 210(2) as the sub-index in which to search for the given fingerprint. The fingerprint service searches for the given fingerprint FP 230 (2) in FP type sub-index 210(2) and locates index record 270(1), which indicates the corresponding segment (segment data 220(1)) is already stored in deduplicated data store 140. Similarly, another client may request a lookup for fingerprint 230(N) of the third fingerprint type FP'''. After using fingerprint type FP''' to identify and select FP type sub-index 210 (N), searching FP type sub-index 210(N) for fingerprint 230 (N) also locates index record 270(1), which similarly indicates the corresponding segment is already stored in deduplicated data store 140.

Fingerprint index 145 also includes one or more segment descriptors 280(1)-(N), where each index record is associated with (or includes) a segment descriptor of the corresponding segment. Segment descriptor 280 includes information (e.g., metadata) that describes the corresponding segment, such as a storage location of the segment, a file name of the file of which the segment is a part, an offset address (e.g., an offset in the file where the segment was originally located), an object identifier (ID), a globally unique identifier (GUID), and the like. Segment descriptor 280 is generated for a corresponding segment at the time the index record for the corresponding segment is added (or appended) to fingerprint index 145.

In one embodiment, once an index record is found (or located) in fingerprint index 145, information of the located index record (including segment descriptor 280 associated with the located index record) is returned to the requesting client. If no matching fingerprint is found in the selected FP type sub-index (e.g., the fingerprint of the fingerprint descriptor does not match the fingerprints present in sub-index entries of the selected FP type sub-index), a message can be returned to the requesting client that indicates no index record was found. Such a "no match" message can include a null index record or other message identifier that indicates no matching fingerprint was found.

If an index record for the corresponding segment is not found, the client can also request that the one or more fingerprints be added to the fingerprint index (e.g., add the one or more fingerprints to a new index record for the corresponding segment), where the one or more fingerprints are associated with one another in the fingerprint index. For example, a client may request a lookup for a fingerprint of fingerprint type FP' that identifies segment 220(N), which is not present in FP type sub-index 210(2) (which is the FP type sub-index associated with FP'). If this were the only fingerprint that the client requested, the absence of the requested fingerprint from the FP' sub-index would indicate that segment 220(N) is not stored in deduplicated data store 140. In response, the client would request that the fingerprint corresponding to 220(N) be added to fingerprint index 145 (e.g., in a new index record) and a redundant copy of segment 220(N) would also be added to deduplicated data store 140. However, if the client also included fingerprint 250(1) of fingerprint type FP and/or fingerprint 250(N) of fingerprint type FP''' in the request, fingerprint service module 135 would have discovered one of the associated fingerprints (e.g., would find index record 270(N) using either FP 250(1) or FP''' 250(N)). The presence of one of the associated fingerprints in fingerprint index 145 (e.g., or presence of the index record containing the associated fingerprints) indicates that corresponding segment 220(N) is already stored in deduplicated data store 145 and need not be stored again, thus avoiding storage of a redundant segment in deduplication data storage 140. Thus, in one embodiment, it is preferred that fingerprint index 145 store as many known fingerprint types (as possible) and that a client request include as many known associated fingerprints of different fingerprint types (as possible) to improve the probability of locating a matching fingerprint in fingerprint index 145.

Finally, the client can instruct fingerprint service module 135 to add a new fingerprint to fingerprint index 145. The client can also instruct fingerprint service module 135 to associate the new fingerprint with one or more other fingerprints in fingerprint index 145 (e.g., create a new association to associate two or more fingerprints, or update an existing association of two or more fingerprints to include the new fingerprint). In an embodiment using index records, an association can be created and/or updated by adding a new fingerprint to a new index record (e.g., the absence of other fingerprints in the new index record indicates no other fingerprints are (yet) associated with the new fingerprint) or an existing index record (e.g., the presence of two or more fingerprints, including the new fingerprint, in an index record indicates an association among the two or more fingerprints).

Figure 3:
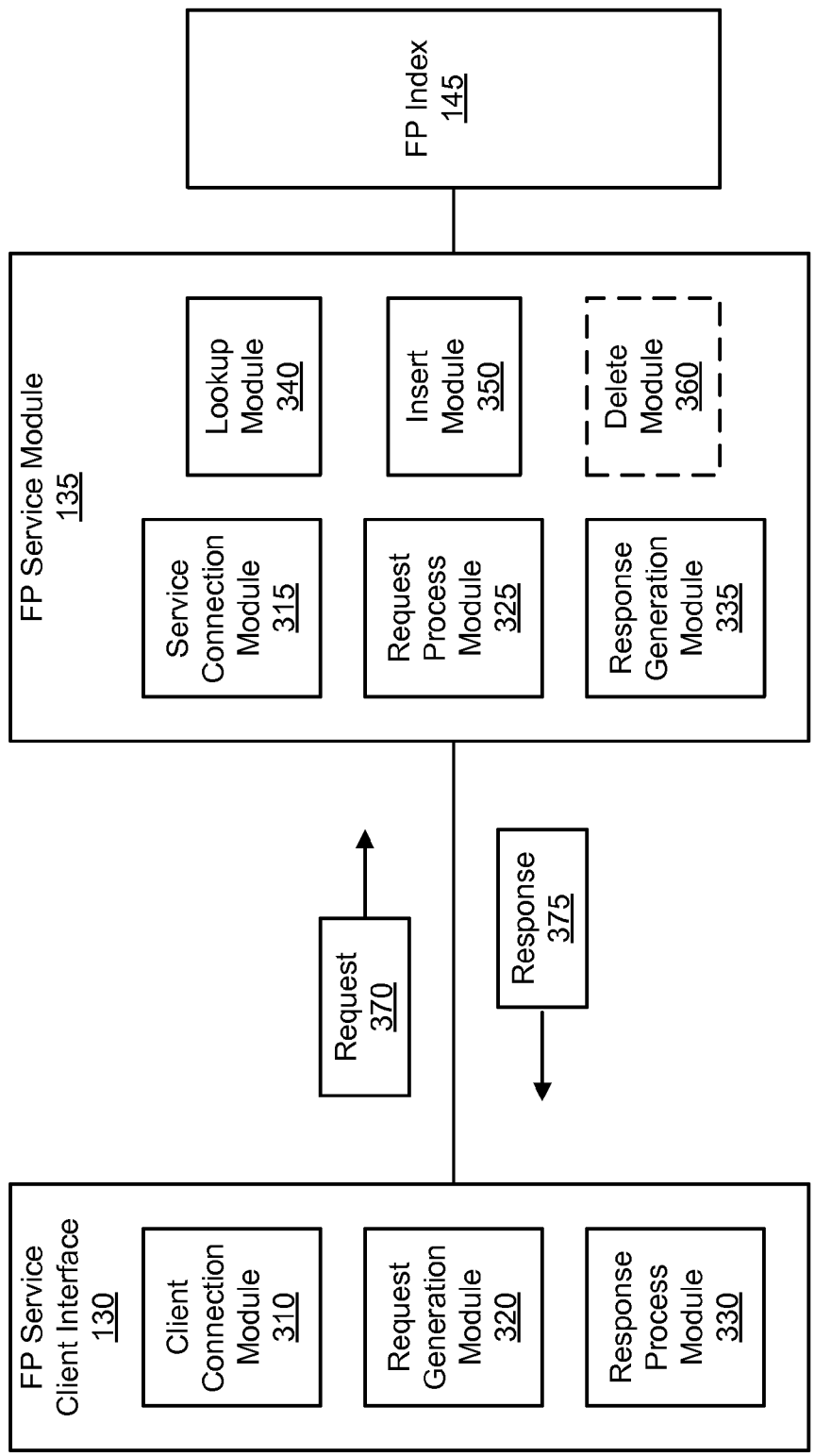
FIG. 3 is a simplified block diagram illustrating components of an example fingerprint service client interface and an example fingerprint service module in which the present disclosure can be implemented, according to one embodiment.

FIG. 3 illustrates components of an example fingerprint service implemented by a fingerprint (FP) service client interface 130 and a fingerprint (FP) service module 135. FP service client interface 130 includes a client connection module 310, a request generation module 320, and a response process module 330. FP service module 135 includes a service connection module 315, a request process module 325, a response generation module 335, a lookup module 340, an insert module 350, and (optionally, as indicated by the broken lined box) a delete module 360. Each component is discussed below.

FP service client interface 130 can be implemented on client 110 as a software interface. In one embodiment, FP service client interface 130 can be implemented by a library (or collection of downloadable program code) that is linked to a client application or component on client 110 (e.g., linked to a backup and/or deduplication application or component). FP service client interface 130 can implement a fingerprint (FP) service API (application programming interface) to communicate with the FP service module 135. In one embodiment, the fingerprint service is implemented as a web service, meaning that FP service module 135 can be accessed by an instance of FP service client interface 130 (that implements the FP service API) over the Internet from anywhere in the world. The FP service API provides a number of routines or calls supported by FP service module 135, such as a connect call and disconnect call, an insert call, a lookup call, and (optionally) a delete call, which are further discussed below.

FP service client interface 130 is configured to communicate with FP service module 135 by exchanging messages (e.g., according to the FP service API), such as one or more request(s) 370 and one or more corresponding response(s) 375. Multiple requests can be transmitted from FP service client interface 130 to FP service module 135, without waiting for a corresponding response to be received before sending the next request.

Client connection module 310 of FP service client interface 130 is configured to open a connection with service connection module 315 of FP service module 135 by transmitting an open connection request message (e.g., a connect call) to service connection module 315. Service connection module 315 decides whether to accept the connection request. In one embodiment, service connection module 315 decides to accept the request after determining the requesting FP service client interface 130 (and/or the client application or component, as further discussed below) is authorized to use the fingerprint service. Service connection module 315 sends a response to client connection module 310 indicating the connection request is accepted and a connection is established between client connection module 310 and service connection module 315. FP service client interface 130 can then transmit one or more request(s) 370 to FP service module 135 via the established connection. FP service module 135 can also transmit one or more response(s) 375 (which correspond to the one or more request(s) 370) to FP service client interface 130 via the same connection.

Service connection module 315 is configured to establish a requested connection with each of a number of different clients implementing an instance of FP service client interface. Service connection module 315 is configured to track such connections, as well as the one or more request(s) 370 received on each connection in order to properly transmit the corresponding one or more response(s) 375 to the requesting FP service client interface instance. Client connection module 310 is also configured to close the connection by sending a close connection request message to service connection module 315 (e.g., a disconnect call) once the one or more response(s) 375 corresponding to outstanding request(s) 370 have been received.

Request generation module 320 of FP service client interface 130 (that is implemented on client 110(1)) is configured to generate a request 370 in response to receipt of a client request to access the fingerprint service. The client request is received from a client application (and/or component thereof) hosted on client 110(1), such as a deduplication application and/or component that wishes to perform deduplication using the fingerprint service. Request generation module 320 receives at least one fingerprint value and at least one corresponding fingerprint type from the requesting client application and/or component (since the fingerprint service does not generate fingerprints). Request generation module 320 generates an empty request message and inserts the received fingerprint value and fingerprint type into the empty request message to produce request 370. Example requests are further discussed below, such as a lookup request discussed in connection with FIGS. 4A and 4B, and an insert request (and optional delete request) discussed in connection with FIGS. 5A and 5B.

Request generation module 320 may also associate an application identifier with the requesting client application and/or component, where the application identifier uniquely identifies the client application and/or component that made the client request. Request generation module 320 may also associate a request identifier with the client request, where the request identifier uniquely identifies the client request. Request generation module 320 may also include the request identifier in request 370, which corresponds to the client request. Request generation module 320 may also record or log information about request 370 in order to provide the corresponding response 375 to the proper client application and/or component that made the client request. For example, request generation module 320 may associate and store the application identifier and the request identifier that correspond to request 370.

Request generation module 320 is also configured to provide request 370 to client connection module 310, which is configured to transmit request 370 to service connection module 315 via the connection established for client 110(1). Client connection module 310 may append other information to request 370, such as a connection identifier that uniquely identifies the particular connection on which request 370 is transmitted, other header information, and the like. Client connection module 310 is also configured to record or log information about request 370 in order to identify the corresponding response 375 received from FP service module 135. Such information can include the connection identifier, the request identifier associated with request 370, and the like.

Service connection module 315 is configured to receive request 370 via the connection from client 110(1). Service connection module 315 is also configured to record or log information about request 370 in order to properly transmit a corresponding response 375 to the instance of client connection module 130 that sent request 370. Such information can include a connection identifier and/or a request identifier associated with request 370 (e.g., extracted from request 370), which are discussed above.

Service connection module 315 is also configured to provide request 370 to request process module 325, which is configured to determine whether request 370 includes a lookup request (e.g., a lookup call), an insert request (e.g., an insert call), or (optionally) a delete request (e.g., a delete call). Request process module 325 processes request 370 accordingly, such as by passing the fingerprint value and fingerprint type of request 370 to a respective operation module, and instructing the respective operation module to perform the respective operation. For example, request process module 325 is configured to instruct lookup module 340 to perform a lookup operation in response to receiving a lookup request (e.g., search for the fingerprint value in the FP type sub-index that is associated with the fingerprint type in order to identify an index record that includes the fingerprint value). Request process module 325 is also configured to instruct insert module 350 to perform an insert operation in response to receiving an insert request (e.g., insert the fingerprint value into a sub-index entry of the FP type sub-index that is associated with the fingerprint type, and/or add an index record including the fingerprint value to the fingerprint index). Request process module 325 is also configured (optionally) to instruct delete module 360 to perform a delete operation in response to receiving a delete request (e.g., delete the fingerprint value from a sub-index entry of the FP type sub-index that is associated with the fingerprint type, and/or remove the index record including the fingerprint value from the fingerprint index).

Lookup module 340, insert module 350, and delete module 360 are configured to inform request process module 325 of the result of the respective request (e.g., whether the request was completed successfully). Request process module 325 is configured to instruct response generation module 335 to generate a response 375 that corresponds to request 370. Response generation module 335 generates an empty response message and inserts information from the result into the empty response message to produce response 375. Information from the result of the request can include a segment descriptor or an associated fingerprint (if the client is authorized to receive the associated fingerprint). Example responses are further discussed below, such as a lookup response discussed in connection with FIGS. 4A and 4B, and an insert response (and optional delete response) discussed in connection with FIGS. 5A and 5B.

Response generation module 335 is also configured to provide response 375 to service connection module 315, which is configured to transmit lookup response 375 to client connection module 310 via the connection established for client 110(1). Service connection module 315 may append other information (e.g., the information previously recorded or logged) to response 375, such as a connection identifier (which matches the connection identifier of corresponding request 370), a request identifier (which matches the request identifier of corresponding request 370), other header information, and the like.

Client connection module 310 is configured to receive response 375 and provide response 375 to response process module 330, which is configured to return the results to the client application and/or component that made the request. Response process module 330 uses the information previously recorded or logged (e.g., an application identifier associated with the request identifier included in response 375) to return the result to the client application and/or component that made the request.

Figure 4A:
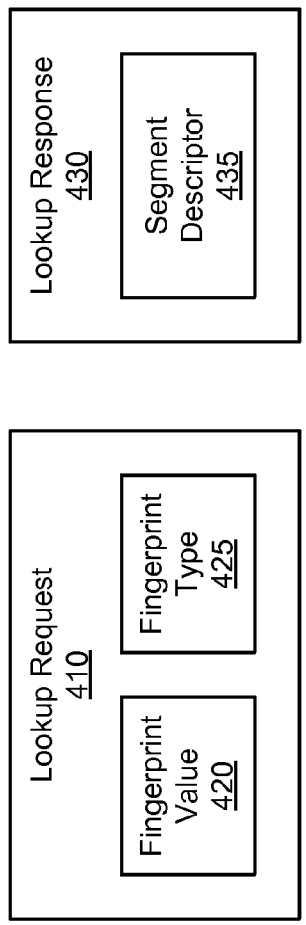
FIGS. 4A and 4B are simplified block diagrams illustrating components of an example lookup request message and lookup response message, according to one embodiment.

FIG. 4A illustrates components of an example lookup request message 410 (also referred to as lookup request 410) and an example lookup response message 430 (also referred to as lookup response 430). In the embodiment shown, lookup request 410 is configured to include a fingerprint value 420 and a corresponding fingerprint type 425 that identifies the fingerprint type of fingerprint value 420. Request process module 325 is configured to instruct lookup module 340 to perform a lookup operation for fingerprint value 420 in the sub-index identified by fingerprint type 425. Lookup request 410 may include other information not shown, such as a connection identifier that uniquely identifies the particular connection on which lookup request 410 is transmitted, a lookup request identifier that uniquely identifies the particular lookup request being transmitted from the requesting client 110(1), a target fingerprint type that identifies the fingerprint type of an associated fingerprint that the client wishes to receive (if the client is authorized to request and receive an associated fingerprint), other header information, and the like.

Lookup response 430 includes information of a result of the performed lookup operation. For example, the result may include a message indicating whether the operation was successful. Lookup module 340 returns the result to request process module 325, which triggers response generation module to include information of the result in lookup response 430. In the embodiment shown, lookup response 430 includes a segment descriptor 435 associated with fingerprint value 420. Segment descriptor 435 includes information (or metadata) that describes the segment identified by fingerprint value 420, as discussed above in connection to segment descriptor 280.

If the lookup operation is successful (e.g., fingerprint value 420 is found in a sub-index entry of the FP type sub-index associated with fingerprint type 425), lookup module 340 returns the segment descriptor that is associated with fingerprint value 420 (e.g., the segment descriptor in the same index record as fingerprint value 420) as the result. In another embodiment, if the lookup operation is successful, lookup module 340 returns a located index record that includes fingerprint value 420 as the result, where lookup response 430 includes information extracted from the located index record, such as an associated fingerprint of the target fingerprint type (if present in the located index record) and/or segment descriptor 435.

If the lookup operation is not successful (e.g., fingerprint value 420 is not found in a sub-index entry of the FP type sub-index associated with fingerprint type 425), lookup module 340 will return some indication that the lookup operation was not successful (e.g., an empty or null segment descriptor, an error or a "no match found" message, and the like) as the result.

Figure 4B:
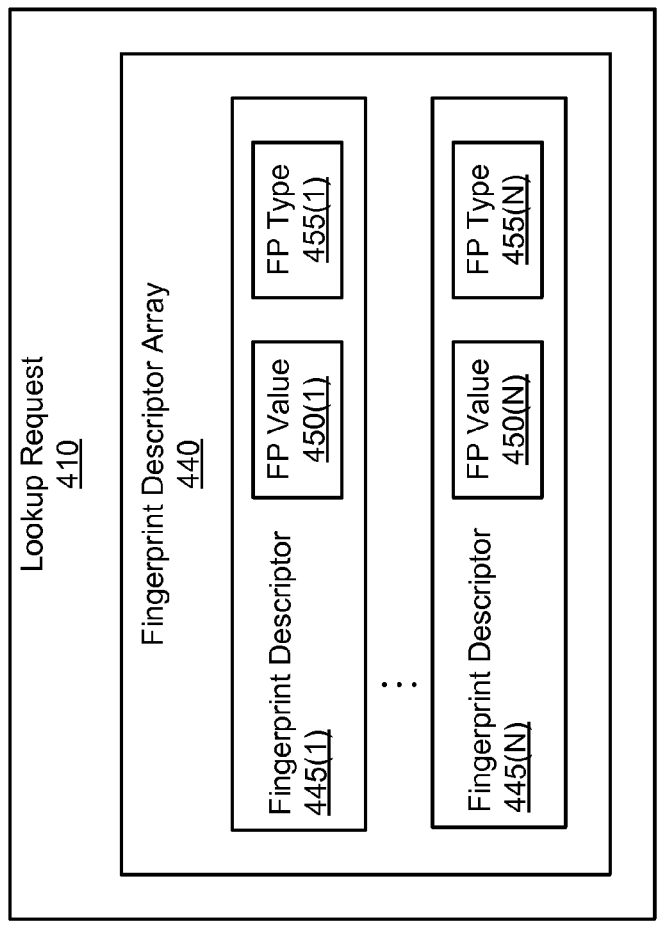

FIG. 4B illustrates components of another example lookup request message. In the embodiment illustrated, lookup request 410 includes a fingerprint descriptor array 440, which includes one or more fingerprint descriptors 445(1)-(N). As described above, each fingerprint descriptor 445 includes a pairing of a fingerprint value (e.g., fingerprint value 450(1)) and a corresponding fingerprint type (e.g., fingerprint type 455(1)). Thus, fingerprint descriptor array 440 includes N fingerprint descriptors, or N pairs of fingerprint values 450 (1)-(N) and corresponding fingerprint types 455(1)-(N). Fingerprint values 450(1)-(N) identify a same segment. Request process module 325 is configured to instruct lookup module to perform a lookup operation for each of fingerprint values 450(1)-(N) until a matching fingerprint is found. For a given fingerprint value, a fingerprint type corresponding to the given fingerprint value is used to identify and select an FP type sub-index in which to search for the given fingerprint value. The lookup request process is further discussed below in connection with FIG. 6.

FIG. 5A illustrates components of an example insert request message 510 (also referred to as insert request 510). In the embodiment shown, insert request 510 is configured to include a fingerprint value 520 and a corresponding fingerprint type 525 that identifies the fingerprint type of fingerprint value 520. Request process module 325 instructs insert module 350 to perform an insert operation of fingerprint value 520 into the FP type sub-index identified by fingerprint type 525. For example, fingerprint value 520 is inserted into a new sub-index entry of the FP type sub-index identified by fingerprint type 525. In an embodiment using index records, fingerprint value 520 is inserted into a sub-index entry (or field of) an index record, where the sub-index entry corresponds to fingerprint type 525. In some embodiments, before instructing insert module 350 to perform the insert operation, request process module 325 instructs lookup module 340 to perform a lookup operation using fingerprint value 520 and fingerprint type 525 to ensure that fingerprint value 520 is not already present in fingerprint index 145 (e.g., prevent the insertion of a requested fingerprint that is already present in fingerprint index 145).

Insert request 510 can also include segment descriptor 530 that corresponds to the segment identified by fingerprint value 520. Segment descriptor 530 includes information (or metadata) that describes the segment, as discussed above in connection to segment descriptor 280. As part of the insert operation, segment descriptor 530 is inserted into fingerprint index 145 and is associated with the sub-index entry containing fingerprint value 520. Additional metadata (e.g., the storage location of the segment) may also be added to segment descriptor 530 by request process module 325 before segment descriptor 530 is inserted into fingerprint index 145. In an embodiment using index records, segment descriptor 530 is inserted into the index record that contains fingerprint value 520. If the fingerprint index (or index record) already includes an associated segment descriptor, segment descriptor 530 need not be inserted again, but the metadata of segment descriptor 530 can be used to update the existing segment descriptor.

Insert request 510 may include other information not shown, such as a connection identifier that uniquely identifies the particular connection on which insert request 510 is transmitted, an insert request identifier that uniquely identifies the particular insert request being transmitted from the requesting client 110(1), other header information, and the like.

Although not shown, an insert response includes a result of the performed insert operation (e.g., whether the insert operation was successful). If the insert operation is successful (e.g., fingerprint value 520 is successfully added to a sub-index entry associated with fingerprint type 525), insert module 350 will return some indication that the insert operation was successful (e.g., an "insert complete" message, and the like) as the result. If the insert operation is not successful (e.g., fingerprint value 520 is already present in a sub-index entry associated with fingerprint type 525 and does not need to be inserted), insert module 350 will similarly return some indication that the insert operation was not successful (e.g., a "no insert needed" message, an error message, and the like) as the result. Insert module 350 provides the result to response generation module 335, which includes the result in the insert response.

FIG. 5B illustrates components of another example insert request message. In the embodiment illustrated, insert request 510 includes a fingerprint descriptor array 540, which includes one or more fingerprint descriptors 545(1)-(N). As described above, a fingerprint descriptor includes a pairing of a fingerprint value (e.g., fingerprint value 550(1)) and a corresponding fingerprint type (e.g., fingerprint type 555(1)). Fingerprint descriptor array 540 includes N fingerprint descriptors, or N pairs of fingerprint values 550(1)-(N) and corresponding fingerprint types 555(1)-(N). Fingerprint values 550(1)-(N) identify a same segment. Request process module 325 is configured to instruct insert module 350 to perform an insert operation for each of fingerprint values 550(1)-(1) until all fingerprint values 550(1)-(N) are present in a respective sub-index entry that corresponds to the respective fingerprint type 555(1)-(N) and are associated with one another in fingerprint index 145. In an embodiment using index records, fingerprint values 550(1)-(N) are associated with one another by being present in respective sub-index entries of a single index record that corresponds to the same segment. In some embodiments, before instructing insert module 350 to perform the insert operation(s), request process module 325 is configured to perform a lookup operation for each of the N fingerprints to ensure that the N fingerprints are not already present in fingerprint index 145 (e.g., in order to prevent the insertion of any requested fingerprints that are already present in fingerprint index 145). The insert request process is further discussed below in connection with FIG. 7-8.

In some embodiments, FP service module 135 also supports a delete request (e.g., a delete call), which would be called when a segment is removed from deduplicated data store 140 (e.g., the segment is no longer needed in a backup, has expired, or otherwise needs to be removed from the deduplicated data store). In an embodiment that supports a delete request, the delete request is configured to include a fingerprint value that identifies the deleted segment and a corresponding fingerprint type that identifies the fingerprint type of the fingerprint value. Request process module 325 is configured to instruct delete module 360 to perform a delete operation for the given fingerprint value in the FP type sub-index identified by the given fingerprint type. For example, delete module 360 uses the fingerprint value to identify a matching fingerprint value contained in a sub-index entry of FP type sub-index and deletes the matching fingerprint from the sub-index entry. In an embodiment that uses index records, delete module 360 locates an index record containing the fingerprint value (e.g., performs a lookup operation using the given fingerprint value and fingerprint type to find the index record) and deletes the fingerprint value from the sub-index entry of the index record. In another embodiment, the entire index record is deleted from fingerprint index 145 (since all fingerprints contained in the index record identify the same deleted segment, and therefore should be removed from fingerprint index 145), depending on implementation of delete module 360. The delete request may include other information, such as a connection identifier that uniquely identifies the particular connection on which the delete request is transmitted, a lookup request identifier that uniquely identifies the particular lookup request being transmitted from the requesting client 110(1), other header information, and the like.

The delete response includes a result of the performed delete operation (e.g., indicate whether the delete operation was successful). If the delete operation is successful (e.g., the fingerprint value and/or index record is successfully deleted from fingerprint index 145), delete module 360 will return some indication that the delete operation was successful (e.g., a "delete complete" message, and the like) as the result. If the delete operation is not successful (e.g., the fingerprint value is not present in the fingerprint index and thus cannot be deleted), delete module 360 will similarly return some indication that the delete operation was not successful (e.g., a "no delete" message, an error message, and the like) as the result. Delete module 360 provides the result to response generation module 335, which includes the result in the delete response.

In some embodiments, the delete request includes a fingerprint descriptor array, which includes one or more fingerprint descriptors. As described above, each fingerprint descriptor includes a pairing of a fingerprint value and a corresponding fingerprint type. Thus, the fingerprint descriptor array includes N fingerprint descriptors, or N pairs of fingerprint values and corresponding fingerprint types, where the N fingerprint values identify a same deleted segment. Request process module 325 is configured to instruct delete module to perform a lookup operation for each of the fingerprint values until a matching fingerprint is found, where the matching fingerprint is included in an (identified) index record. In one embodiment, the identified index record can be deleted using any of the one or more fingerprints included in the given index record. This is because the group of fingerprints stored in a given index record identify a same segment stored in deduplicated data store 140. If that segment is deleted or otherwise removed from deduplicated data store 140, all fingerprints that identify that deleted segment also need to be removed from the fingerprint index. In another embodiment, only the matching fingerprints (e.g., the fingerprints of the delete request that match fingerprints present in the identified index record) are deleted from respective sub-index entries of the identified index record.

In some embodiments, the fingerprint service can implement an independent mechanism of verifying whether segments still exist in deduplicated data store 140. For example, when a lookup request is received, the fingerprint service can use the independent verification mechanism to determine whether the corresponding segment is still present in the deduplicated data store. In such an embodiment, a delete call need not be supported. Instead of deleting an index record (or sub-index entry) that contains one or more fingerprint values corresponding to a deleted segment, the index record remains in fingerprint index as an obsolete index record. If a lookup request is received for a deleted segment, the fingerprint service responds with an indication that no fingerprint corresponding to the deleted segment was found in the fingerprint index (even though a fingerprint exists in an obsolete index record). If the deleted segment is later re-inserted into deduplicated data store 140, the segment descriptor of the obsolete index record is overwritten (e.g., a new storage location of the re-inserted segment is used to overwrite an old storage location of the deleted segment), and the index record is no longer obsolete.

Figure 6:
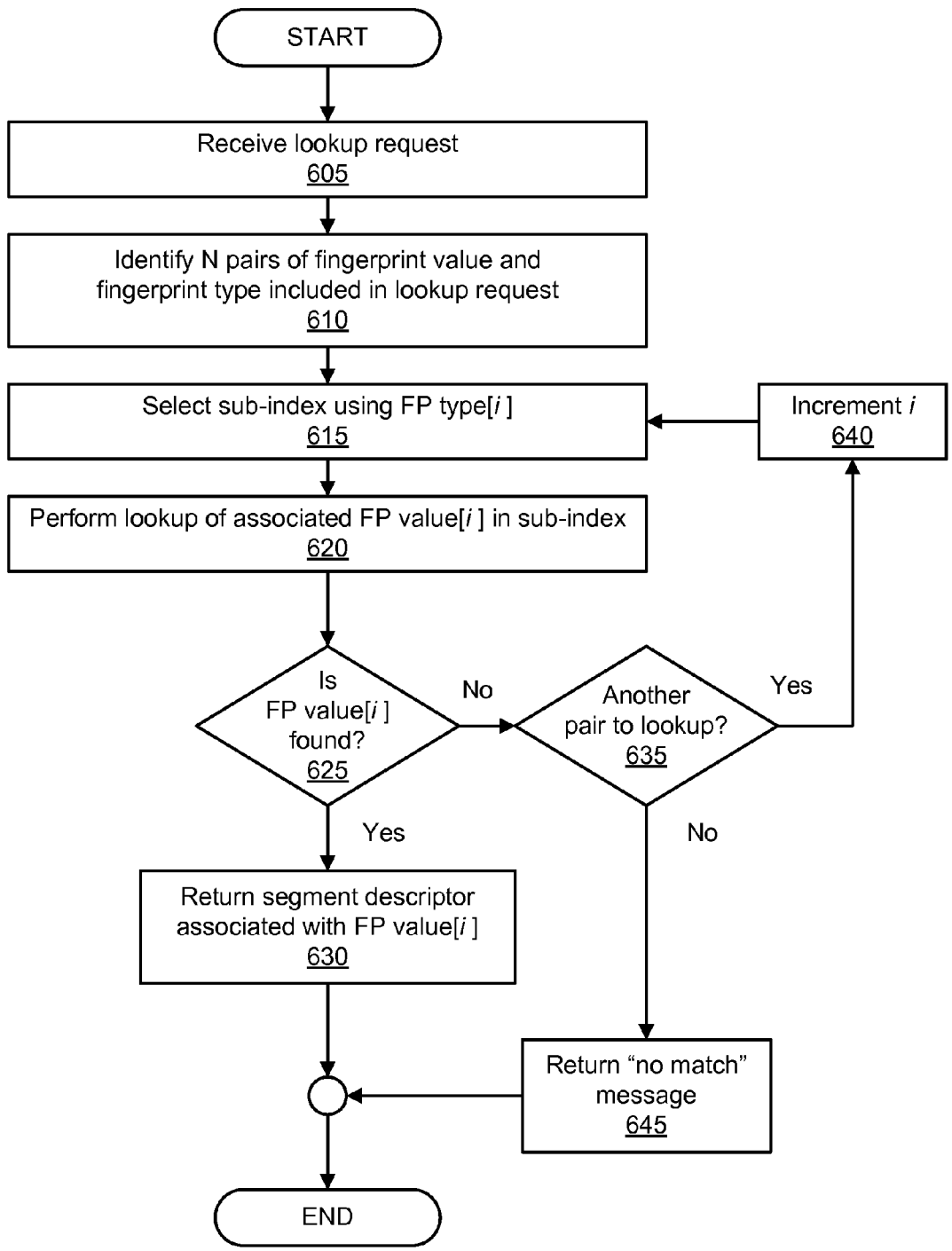
FIG. 6 is a flowchart illustrating an example lookup process implemented by a fingerprint service module, according to one embodiment.

FIG. 6 is a flowchart illustrating an example lookup request process implemented by a fingerprint service module. For example, the process illustrated in FIG. 6 can be implemented cooperatively by components of the fingerprint service module, such as by a service connection module, a request process module, a response generation module, and a lookup module. The process illustrated in FIG. 6 can be initiated or triggered in response to receiving a lookup request.

The process illustrated in FIG. 6 begins at operation 605, where a lookup request is received at fingerprint (FP) service module. The FP service module is implemented or hosted on a computing device (such as a server) in the network, where any request (e.g., a lookup request, an insert request, and/or a delete request) is received at a port of the server computing device coupled to the network. The request is received from an instance of a fingerprint (FP) service client interface module implemented on a computing device (such as a client) in the network, where the request was transmitted from a port of the client computing device coupled to the network. The request is routed or directed to service connection module, which in turn routes the request to the request process module. Request process module is also configured to determine whether the received request is a lookup request, an insert request, or a delete request.

The process continues to operation 610, where the request process module identifies N pairs of fingerprint value and fingerprint type included in the lookup request, where N can be one or greater. The N fingerprint values identify a same segment. The request process module determines that a lookup operation should be performed for the lookup request, and the request process module extracts the N pairs (or N fingerprint descriptors) from the lookup request and provides the N fingerprint descriptors to the lookup module. Operation 610 begins a sequence of operations that can be repeated for each fingerprint descriptor of the N fingerprint descriptors, where a present iteration of the sequence is indicated by the letter i. Operation 610 initializes i to one (thus starting the sequence with a first fingerprint descriptor of the N fingerprint descriptors). At the end of the sequence, the letter i is incremented if there is another fingerprint descriptor to lookup.

The process continues to operation 615, where lookup module identifies a fingerprint (FP) type sub-index that is associated with the fingerprint type [i] of the fingerprint descriptor [i]. The lookup module also selects the (identified) FP type sub-index as the sub-index in which to search for fingerprint value [i] of the fingerprint descriptor [i]. The process continues to operation 620, where the lookup module performs a lookup operation of (or searches for) fingerprint value [i] in the selected FP type sub-index.

The process continues to operation 625, where lookup module determines whether fingerprint value [i] is found in the selected FP type sub-index. If fingerprint value [i] is found, the process continues to operation 630, where the lookup module returns a segment descriptor associated with the fingerprint value [i] to request process module (e.g., returns the segment descriptor that is included in the same index record that contains fingerprint value [i]). The request process module can transmit a response message to the requesting instance of FP service client interface (e.g., via the same port on which the lookup request was received), where the response message includes the segment descriptor. The process then ends.

Returning to operation 625, if the fingerprint value [i] is not found, the process continues to operation 635, where lookup module determines whether there is another pair (or fingerprint descriptor) to lookup. If there is another pair (or fingerprint descriptor) to lookup, the process continues to operation 640, where i is incremented to indicate a next iteration of the sequence of operations (e.g., operations 615-625) for the next fingerprint descriptor. The process then returns to operation 615.

Returning to operation 635, if there are no other pairs to lookup, the process continues to operation 645, where an indication that no fingerprints were found, such as a "no match" message, is returned to request process module. The request process module can trigger response generation module to generate a response message, which is transmitted to the requesting instance of FP service client interface (e.g., via the same port on which the lookup request was received), where the response message includes the "no match" indication or message. The process then ends.

Figure 7A:
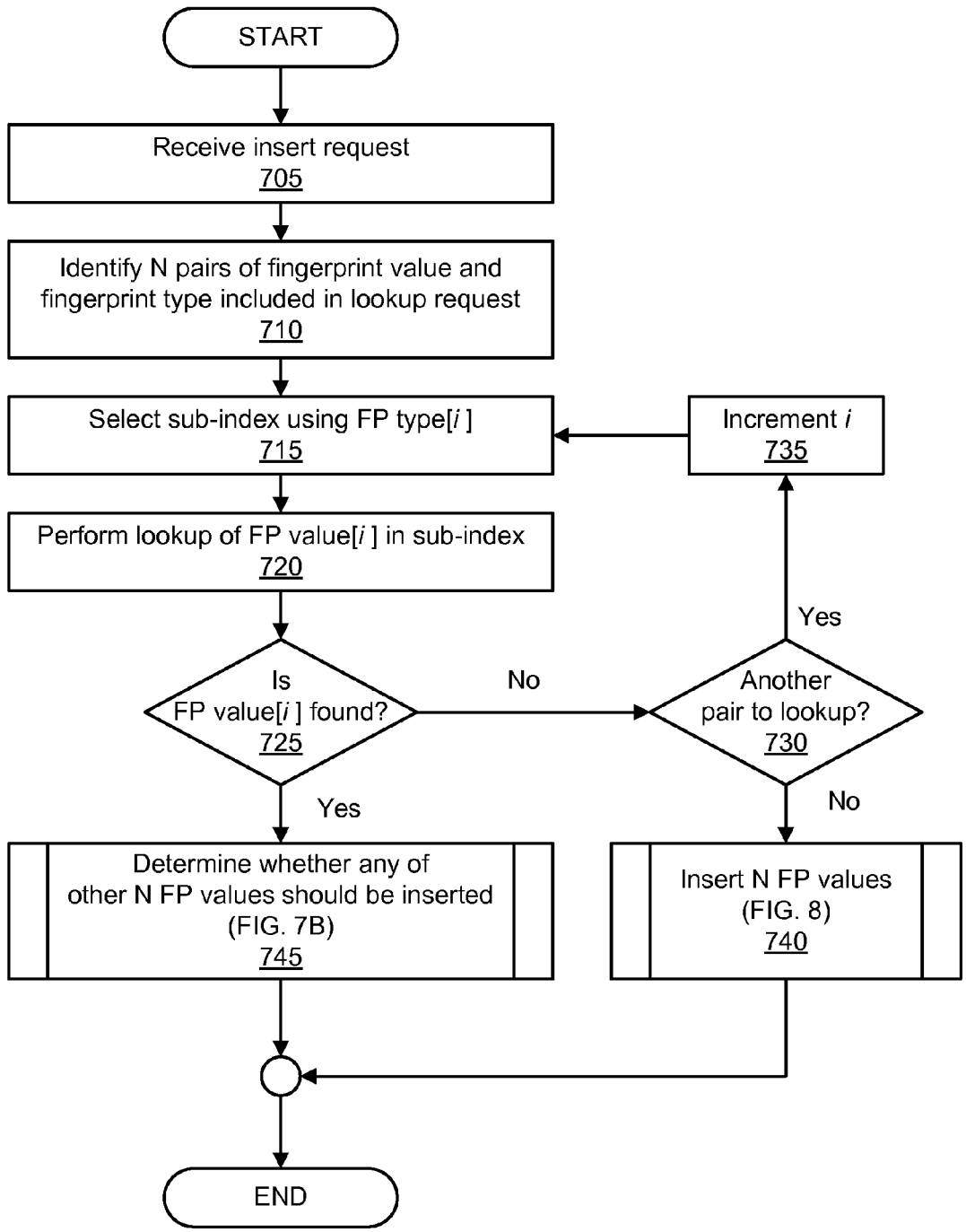
FIGS. 7A, 7B and 8 are flowcharts illustrating an example insert process implemented by a fingerprint service module, according to one embodiment.

FIG. 7A is a flowchart illustrating an example insert request process implemented by a fingerprint service module. For example, the process illustrated in FIG. 7 can be implemented cooperatively by components of the fingerprint service module, such as by a service connection module, a request process module, a response generation module, a lookup module, and/or an insert module. The process illustrated in FIG. 7A can be initiated or triggered in response to receiving an insert request.

The process illustrated in FIG. 7A begins at operation 705, where an insert request is received at the FP service module (e.g., on a port of the computing device hosting the FP service module, as discussed above in connection with FIG. 6). The insert request is routed to the request process module. The process continues to operation 710, where the request process module identifies N pairs of fingerprint value and fingerprint type included in the insert request, where N can be one or greater. The N fingerprint values identify a same segment. The request process module determines that an insert operation should be performed for the insert request. The request process module also determines that a lookup operation should be performed before the insert operation to prevent any duplicate fingerprints from being inserted into the fingerprint index. The request process module extracts the N pairs (or N fingerprint descriptors) from the insert request and provides the N fingerprint descriptors to the lookup module. Operation 710 begins a sequence of operations that can be repeated for each fingerprint descriptor of the N fingerprint descriptors, where a present iteration of the sequence is indicated by the letter i. Operation 710 initializes i to one (thus starting the sequence with a first fingerprint descriptor of the N fingerprint descriptors). At the end of the sequence, the letter i is incremented if there is another fingerprint descriptor.

The process continues to operation 715, where lookup module identifies a fingerprint (FP) type sub-index that is associated with the fingerprint type [i] of the fingerprint descriptor [i]. The lookup module also selects the (identified) FP type sub-index as the sub-index in which to search for fingerprint value [i] of the fingerprint descriptor [i]. The process continues to operation 720, where the lookup module performs a lookup operation of (or searches for) fingerprint value [i] in the selected FP type sub-index.

The process continues to operation 725, where lookup module determines whether fingerprint value [i] is found in the selected FP type sub-index. If fingerprint value [i] is found, the process continues to operation 745, where the lookup module returns a result to request process module, where the result indicates that the fingerprint value [i] was found. In an embodiment that uses index records, the request includes information from an index record containing the fingerprint value [i], such as a globally unique identifier (GUID) of the index record, which uniquely identifies the index record in the fingerprint index. The request process module, in response, determines whether any of the other N fingerprint values of the N fingerprint descriptors should be inserted into the fingerprint index. This operation is further discussed below in connection with FIG. 7B. The process then ends.

Returning to operation 725, if fingerprint value [i] is not found, the process continues to operation 730, where lookup module determines whether there is another pair (or fingerprint descriptor) to lookup. If there is another pair (or fingerprint descriptor) to lookup, the process continues to operation 735, where i is incremented to indicate a next iteration of the sequence of operations (e.g., operations 715-725) for the next fingerprint descriptor. The process then returns to operation 715.

Returning to operation 730, if there are no other pairs to lookup, the process continues to operation 740, where lookup module returns a result to the request process module, where the result indicates that no fingerprint values were found. The request process module, in response, determines that all N fingerprint values of the N fingerprint descriptors should be inserted into the fingerprint index. In response, request process module provides the N fingerprint descriptors to insert module, and triggers insert module to insert the N fingerprint values into fingerprint index and associate the N fingerprint values with one another (e.g., insert into a same (new) index record). This operation is further discussed below in connection with FIG. 8. The process then ends.

Figure 7B:
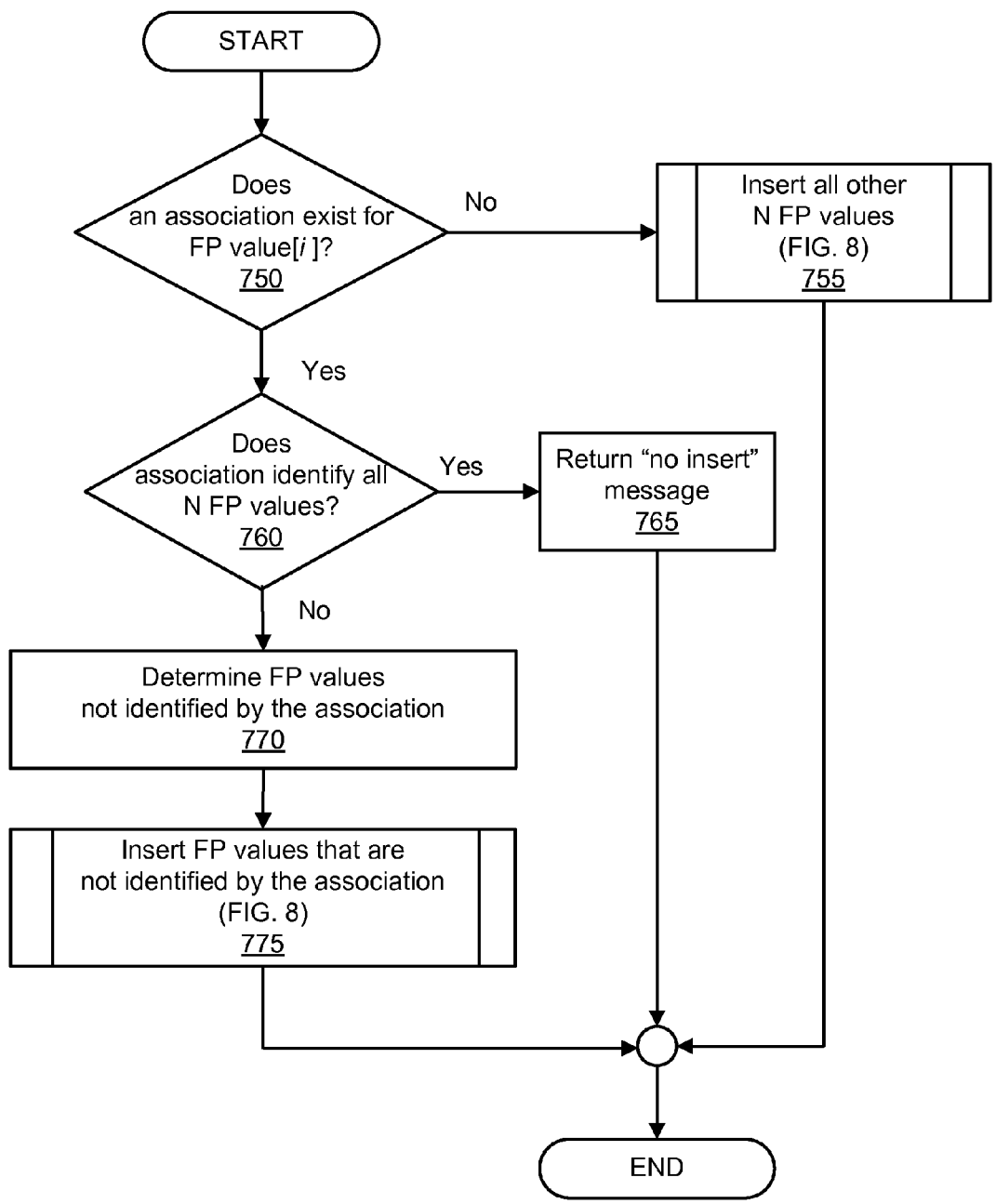

FIG. 7B continues the illustration of the example insert request process implemented by fingerprint service module. The process illustrated in FIG. 7B begins at operation 750, where request process module determines whether an association exists for the (found) fingerprint value [i] (e.g., whether fingerprint value [i] is included in an existing association). If an association does not exist, the process continues to operation 755, where request process module determines that only the single (found) fingerprint value [i] is present in the fingerprint index and that the remaining (or other) fingerprint values of the N fingerprint descriptors should be inserted into the fingerprint index (and associated with the single found fingerprint value [i]). In response, request process module provides the fingerprint descriptors that include the remaining fingerprint values to insert module, and triggers insert module to insert the remaining fingerprint values into the fingerprint index and associate the N fingerprint values with one another. In an embodiment using index records, request process module triggers insert module to insert the remaining fingerprint values into the same index record that includes the found fingerprint value [i] (since the N fingerprint values identify the same segment), such as by providing the GUID of the same index record to insert module. This operation is further discussed below in connection with FIG. 8. The process then ends.

Returning to operation 750, if an association exists for the (found) fingerprint value [i], the process continues to operation 760, where request process module determines whether the association identifies all N fingerprint values of the N fingerprint descriptors. In an embodiment using index records, request process module can determine whether the association (implemented as an index record) includes the N fingerprint values by evaluating the index record that includes the found fingerprint value [i] to determine which of the N fingerprint values are included in the index record. If the association identifies (or the index record includes) all N fingerprint values of the N fingerprint descriptors, the process continues to operation 765, where request process module determines that there are no fingerprints that need to be inserted into the fingerprint index. An indication that no fingerprints need to be inserted, such as a "no insert" message, is returned to request process module. The request process module can trigger response generation module to generate a response message, which is transmitted to the requesting instance of FP service client (e.g., via the same port on which the insert request was received), where the response message includes the "no insert" indication or message. The process then ends.

Returning to operation 760, if the association does not identify (or the index record does not include) all N fingerprint values, the process continues to operation 770, where request process module determines the fingerprint values that are not identified by the association (e.g., the fingerprint values not included in the index record). The process continues to operation 775, where request process module provides the fingerprint descriptors that include the non-identified fingerprint values to insert module, and triggers insert module to insert the non-identified fingerprint values into the fingerprint index and associate the N fingerprint values with one another. In an embodiment using index records, request process module triggers insert module to insert the non-identified fingerprint values into the same index record that includes the found fingerprint value [i] (since the N fingerprint values identify the same segment), such as by providing the GUID of the same index record to insert module. This operation is further discussed below in connection with FIG. 8. The process then ends.

Figure 8:
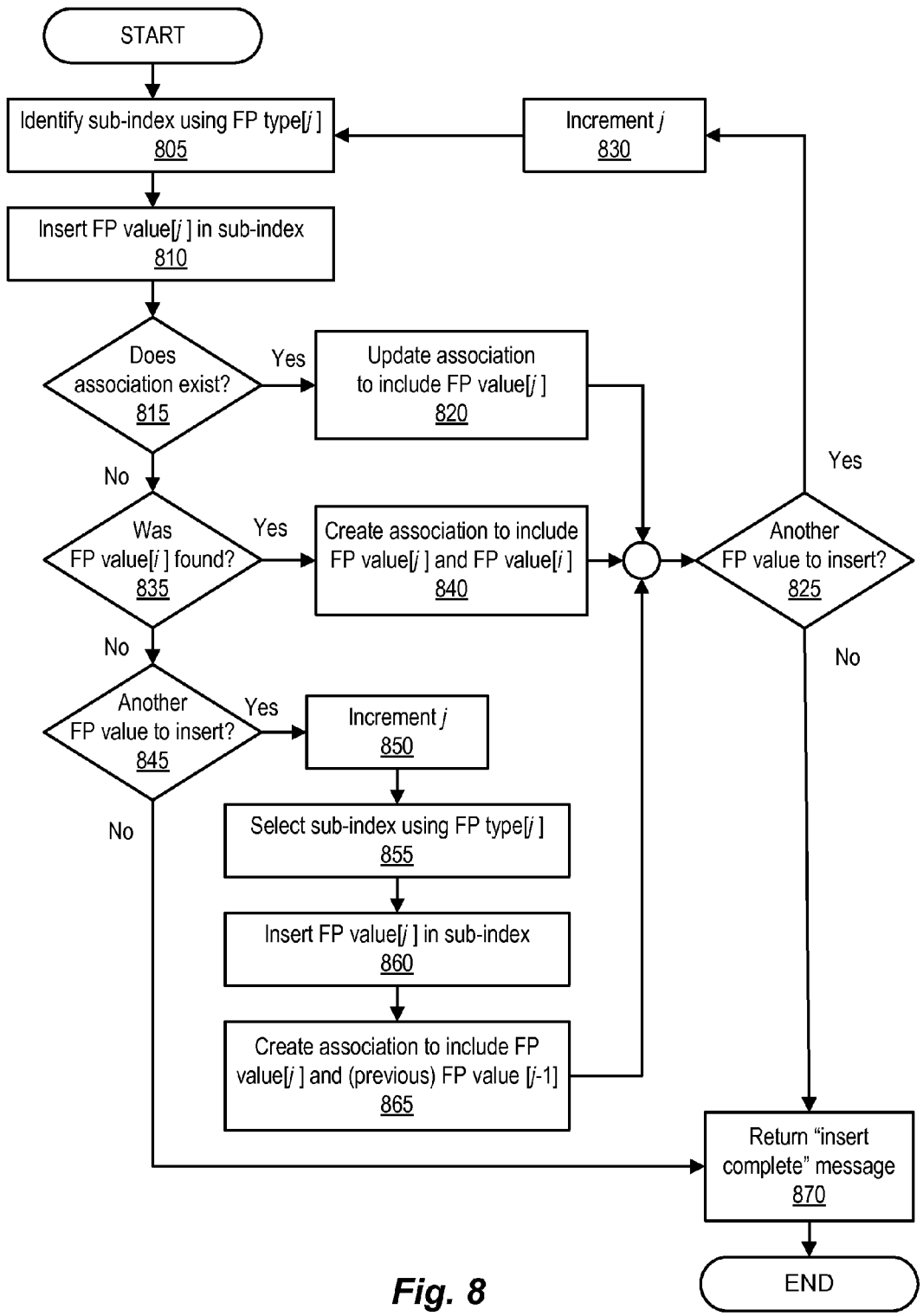

FIG. 8 continues the illustration of the example insert process implemented by an insert module of the fingerprint service module. The process illustrated in FIG. 8 is initiated or triggered in response to the insert module receiving one or more fingerprint descriptors (or pairs of fingerprint value and fingerprint type) to insert into the fingerprint index. In an embodiment of fingerprint index that uses index records as the association, the insert module also receives an indication of whether the fingerprints of the one or more fingerprint descriptors should be inserted into a new index record or into an existing index record (which is identified by a GUID).

In such an embodiment, if the one or more fingerprint values are to be inserted into a new index record, a new index record is created and appended to the fingerprint index. If the one or more fingerprint values are to be inserted into an existing index record, insert module finds the existing index record using the GUID that uniquely identifies the existing index record. The index record (either the new index record or the existing record) includes a number of sub-index entries that each correspond to a FP type sub-index associated with a fingerprint type. Thus, each sub-index entry of the index record can be identified by an associated fingerprint type.

The process of FIG. 8 also includes a sequence of operations that can be repeated for each fingerprint descriptor of the one or more fingerprint descriptors, where a present iteration of the sequence is indicated by the letter j. Before the process of FIG. 8 begins, the letter j is initialized to one (thus starting the sequence with a first fingerprint descriptor of the one or more fingerprint descriptors). At the end of the sequence, the letter j is incremented if there is another fingerprint descriptor to insert.

In an embodiment of fingerprint index including a number of index records (where an index record is an embodiment of an association), FIG. 8 begins at operation 805, where an insert module identifies a sub-index entry (or field) of the index record (which is either the new index record or the existing record) using the fingerprint type [j] of the fingerprint descriptor [j]. The process continues to operation 810, where the insert module inserts fingerprint value [j] into the identified sub-index entry. Thus, by inserting the fingerprint values into corresponding sub-index entries of a single index record, the association is effectively updated to include the newly inserted fingerprint value.

The process then continues to operation 825, where insert module determines whether there is another fingerprint value to insert into the index record. If there is another fingerprint value, the process continues to operation 830, where j is incremented, and the process returns to operation 805 to insert the next fingerprint value. Returning to operation 825, if there are no other fingerprint values to insert, the process continues to operation 870, where insert module returns an "insert complete" indication or message to request process module. The process then ends.

In an embodiment that uses another association implementation (e.g., pointers or other association), the process illustrated in FIG. 8 begins at operation 805, where an insert module identifies an FP type sub-index using the fingerprint type [j] of the fingerprint descriptor [j]. The process continues to operation 810, where the insert module inserts fingerprint value [j] into the identified FP type sub-index. The process continues to operation 815, where insert module determines whether an association exists for fingerprint value [i] (which was previously determined by request process module in operation 750 of FIG. 7B and provided to insert module). If an association exists, the process continues to operation 820, where the association (which already includes fingerprint value [i]) is updated to also include fingerprint value [j].

The process continues to operation 825, where insert module determines whether there is another fingerprint value to insert. If there is another fingerprint value to insert, the process continues to operation 830, where j is incremented to indicate a next iteration of the sequence of operations (e.g., operations 805-815) for the next fingerprint value. The process then returns to operation 805. Returning to operation 825, if there are no more fingerprint values to insert, the process continues to operation 870, where insert module returns an "insert complete" message or indication to request process module. The process then ends.

Returning to operation 815, if an association does not exist, the process continues to operation 835, where insert module determines whether fingerprint value [i] was found (which was previously determined by request process module in operation 725 of FIG. 7A and provided to insert module). If fingerprint value [i] was found (and no association yet exists), the process continues to operation 840, where insert module creates a new association to include fingerprint value [i] and fingerprint value [j]. The process continues to operation 825, as described above.

Returning to operation 835, if fingerprint value [i] was not found, the process continues to operation 845, where insert module determines whether there is another fingerprint value to insert into the fingerprint index. If there is another fingerprint value to insert (and thus another fingerprint with which to make a new association), the process continues to operation 805, where j is incremented for the next fingerprint descriptor. The process continues to operation 855, where insert module identifies and selects an FP type sub-index using the fingerprint type [j] of the fingerprint descriptor [j]. The process continues to operation 860, where insert module inserts fingerprint value [j] into the selected FP type sub-index. The process continues to operation 865, where insert module creates a new association to include the (present) fingerprint value [j] and the (previous) fingerprint value [j−1]. The process continues to operation 825, as described above.

Returning to operation 845, if there are no other fingerprint values to insert the fingerprint index (and thus no other fingerprints with which to make a new association), the process continues to operation 870, where insert module returns an "insert complete" message or indication to request process module. The process then ends.

Figure 9:
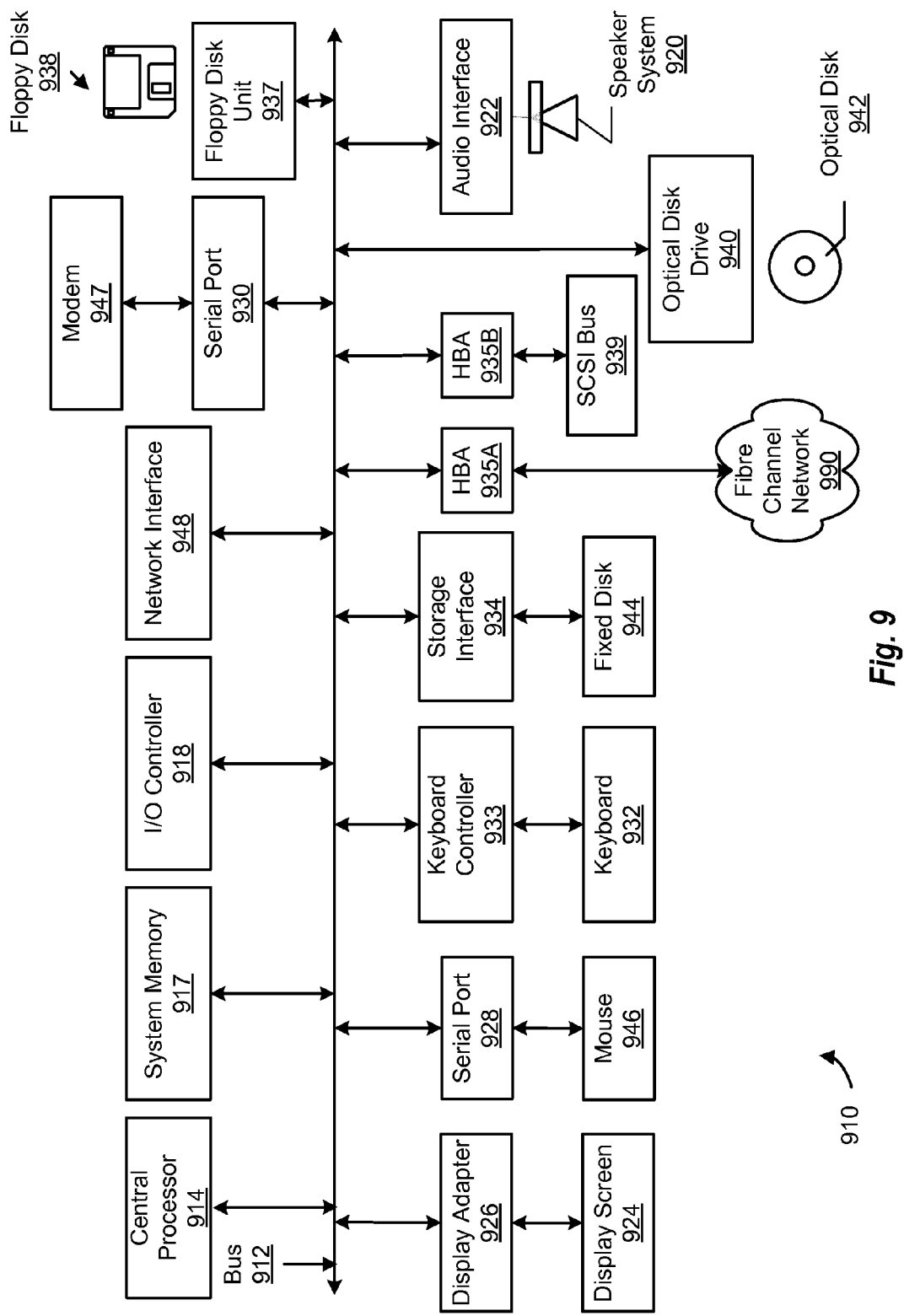
FIG. 9 is a simplified block diagram illustrating components of an example computer system suitable for implementing embodiments of the present disclosure, according to one embodiment.

FIG. 9 is a simplified block diagram that illustrates components of an example computer system 910 that is suitable for implementing the present disclosure. Computer system 910 may be illustrative of various computer systems in system 100, such as client system(s) 110, system(s) that host fingerprint service module 150, fingerprint index 160, and/or deduplicated data store 140, among others. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code for the automatically performing operations on such applications based on their dependencies on other applications (such as described above in reference to the processes of FIG. 6-8), etc., to implement the present disclosure can be stored in computer-readable storage media such as one or more of system memory 917, fixed disk 944, optical disk 942, or floppy disk 938. Memory 917 is also used for storing temporary variables or other intermediate information during the execution of instructions by the processor 914. The operating system provided on computer system 910 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
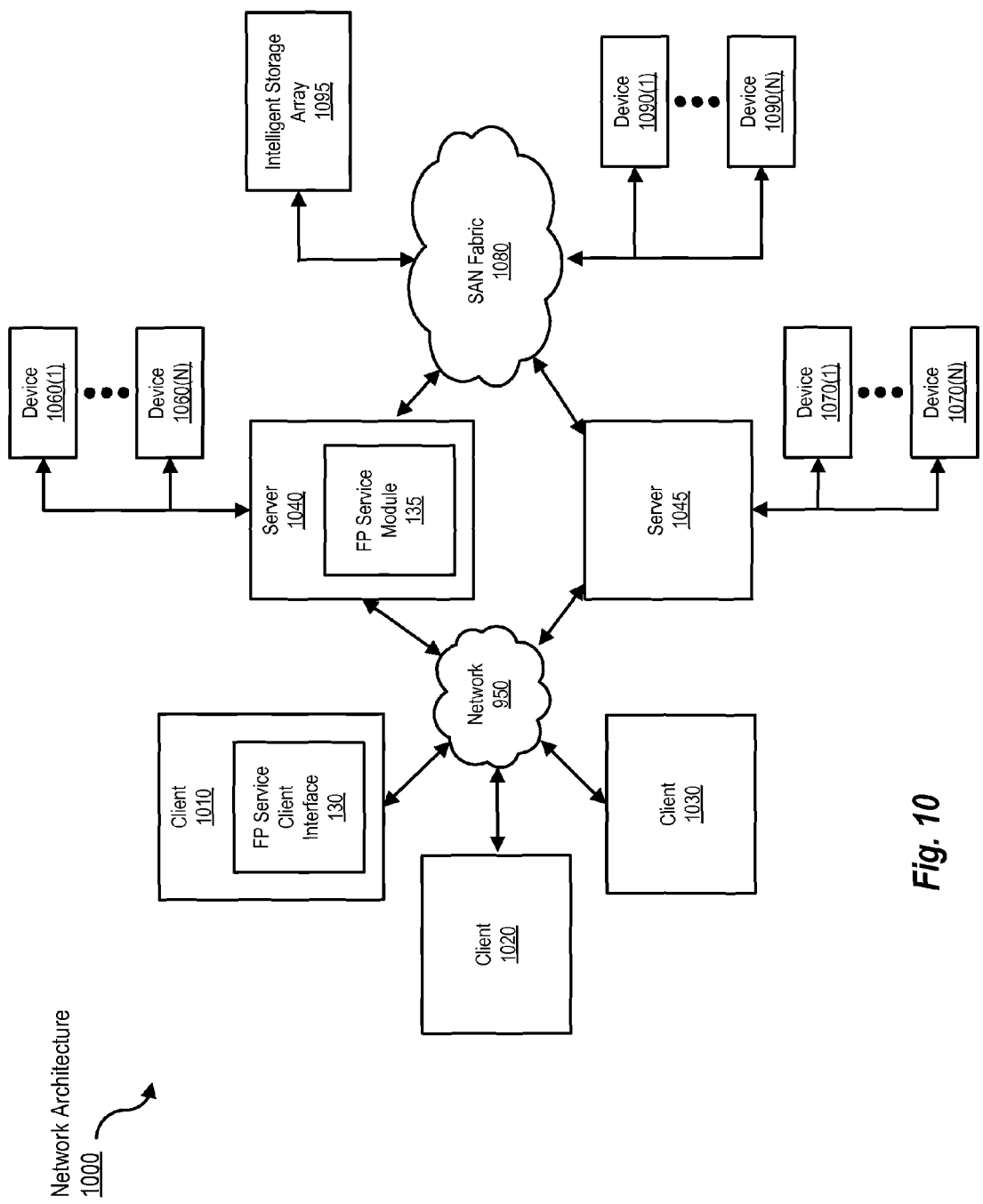
FIG. 10 is a simplified block diagram illustrating components of an example computer system suitable for implementing embodiments of the present disclosure, according to one embodiment.

FIG. 10 is a simplified block diagram illustrating components of an example computer system suitable for implementing embodiments of the present disclosure. FIG. 10 illustrates a network system 1000 in which client systems 1010, 1020 and 1030 and servers 1040, and 1045 can be coupled to a network 1050. Client systems 1010, 1020 and 1030 generally represent any type or form of host computing device or system, such as client system(s) 110 in FIG. 1 and/or computer system 910 in FIG. 9, among others.

Similarly, servers 1040 and 1045 generally represent host computing devices or systems, such as application servers or database servers, configured to provide various database services and/or run certain software applications, such as system(s) that host fingerprint service module 150, fingerprint index 160, and/or deduplicated data store 140 in FIG. 1, and/or computer system 910 in FIG. 9, among others. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) can be directly attached to server 1040. Similarly, one or more storage devices 1070(1)-(N) can be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) can represent network-attached storage (NAS) devices configured to communicate with servers 1040 and 1045 using various protocols, such as Network File System (NFS), Server Message Block (SMB), or Common Internet File System (CIFS). In one example, storage devices 1060(1)-(N) and/or 1070(1)-(N) can store fingerprint index 160 that is accessible via fingerprint service module 150.

Servers 1040 and 1045 can also be connected to a storage area network (SAN) fabric 1080. SAN fabric 1080 generally represents any type or form of computer network or architecture capable of facilitating communication between multiple storage devices. SAN fabric 1080 can facilitate communication between servers 1040 and 1045 and a plurality of storage devices 1090(1)-(N) and/or an intelligent storage array 1095. SAN fabric 1080 can also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and in reference to computer system 910 of FIG. 9, a communication interface can be used to provide connectivity between each client system 1010, 1020, and 1030 and network 1050. Client systems 1010, 1020 and 1030 can be able to access information on server 1040 or 1045 using, for example, a web browser or other client software. Such software can allow client systems 1010, 1020 and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the embodiments disclosed herein can also be encoded as a computer program, stored in and run by server 1040 and server 1045, and distributed to client systems 1010, 1020 and 1030 over network 1050.

In some examples, all or a portion of the computing devices in FIGS. 1, 9, and 10 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, fingerprint service module 150 in FIG. 1 can transform information received from a client system 110 into an association of entries in one or more sub-indexes.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a lookup request, wherein
      the lookup request comprises one or more fingerprint descriptors, and
      each of the one or more fingerprint descriptors comprises a fingerprint value and a corresponding fingerprint type;
   identifying a first fingerprint descriptor of the one or more fingerprint descriptors;
   accessing a fingerprint index, wherein
      the fingerprint index comprises a plurality of sub-indexes,
      each sub-index is associated with a fingerprint type of a plurality of fingerprint types,
      the fingerprint index comprises association information, and
      the association information associates fingerprints of different fingerprint types that identify same data segments;
   selecting a first sub-index of the fingerprint index, wherein
      the first sub-index is associated with a first fingerprint type of the first fingerprint descriptor;
   performing a lookup operation for a first fingerprint value of the first fingerprint descriptor, wherein
      the lookup operation is performed in the first sub-index; and
   in response to the first fingerprint value being present in the first sub-index,
      returning information associated with the first fingerprint value.

2. The method of claim 1, wherein
   the information comprises a segment descriptor,
   the segment descriptor comprises metadata that describes a segment stored in a deduplicated data store, and
   the first fingerprint value identifies the segment.

3. The method of claim 1, wherein
   the information comprises a second fingerprint value of a second fingerprint type,
   the first fingerprint value and the second fingerprint value are associated with one another in the fingerprint index, and
   the first fingerprint value and the second fingerprint value identify a same segment.

4. The method of claim 1, further comprising:
   in response to the first fingerprint value not being present in the first sub-index,
      identifying a second fingerprint descriptor of the one or more fingerprint descriptors,
      selecting a second sub-index of the fingerprint index, wherein
         the second sub-index is associated with a second fingerprint type of the second fingerprint descriptor, and
      performing a second lookup operation for a second fingerprint value of the second fingerprint descriptor, wherein
         the second lookup operation is performed in the second sub-index, and
         the first fingerprint value and the second fingerprint value identify a same segment.

5. The method of claim 4, further comprising:
   in response to the second fingerprint value not being present in the second sub-index,
      inserting the first fingerprint value into the first sub-index,
      inserting the second fingerprint value into the second sub-index, and
      creating an association in the fingerprint index, wherein the association comprises the first fingerprint value and the second fingerprint value.

6. The method of claim 5, further comprising:
   in response to a third fingerprint value not being present in a third sub-index,
      inserting the third fingerprint value into the third sub-index, and
      updating the association to comprise the third fingerprint value.

7. The method of claim 1, further comprising:
   in response to one or more fingerprint values of the one or more fingerprint descriptors not being present in the fingerprint index,
      returning an indication that the one or more fingerprint values were not found, wherein
         the plurality of sub-indexes comprises the first sub-index, and
         each of the one or more fingerprint values is not present in a corresponding one of the plurality of sub-indexes.

8. A non-transitory computer readable storage medium configured to store program instructions that, when executed on a processor, are configured to cause the processor to perform a method comprising:
   receiving a lookup request, wherein
      the lookup request comprises one or more fingerprint descriptors, and
      each of the one or more fingerprint descriptors comprises a fingerprint value and a corresponding fingerprint type;
   identifying a first fingerprint descriptor of the one or more fingerprint descriptors;
   accessing a fingerprint index, wherein
      the fingerprint index comprises a plurality of sub-indexes,
      each sub-index is associated with a fingerprint type of a plurality of fingerprint types, the fingerprint index comprises association information, and the association information associates fingerprints of different fingerprint types that identify same data segments;

selecting a first sub-index of the fingerprint index, wherein the first sub-index is associated with a first fingerprint type of the first fingerprint descriptor;

performing a lookup operation for a first fingerprint value of the first fingerprint descriptor, wherein the lookup operation is performed in the first sub-index; and in response to the first fingerprint value being present in the first sub-index, returning information associated with the first fingerprint value.

9. The non-transitory computer readable storage medium of claim 8, wherein the information comprises a segment descriptor, the segment descriptor comprises metadata that describes a segment stored in a deduplicated data store, and the first fingerprint value identifies the segment.

10. The non-transitory computer readable storage medium of claim 8, wherein the information comprises a second fingerprint value of a second fingerprint type, the first fingerprint value and the second fingerprint value are associated with one another in the fingerprint index, and the first fingerprint value and the second fingerprint value identify a same segment.

11. The non-transitory computer readable storage medium of claim 8, the method further comprising:

in response to the first fingerprint value not being present in the first sub-index, identifying a second fingerprint descriptor of the one or more fingerprint descriptors, selecting a second sub-index of the fingerprint index, wherein the second sub-index is associated with a second fingerprint type of the second fingerprint descriptor, and performing a second lookup operation for a second fingerprint value of the second fingerprint descriptor, wherein the second lookup operation is performed in the second sub-index, and the first fingerprint value and the second fingerprint value identify a same segment.

12. The non-transitory computer readable storage medium of claim 11, the method further comprising:

in response to the second fingerprint value not being present in the second sub-index, inserting the first fingerprint value into the first sub-index, inserting the second fingerprint value into the second sub-index, and creating an association in the fingerprint index, wherein the association comprises the first fingerprint value and the second fingerprint value.

13. The non-transitory computer readable storage medium of claim 12, the method further comprising:

in response to a third fingerprint value not being present in a third sub-index, inserting the third fingerprint value into the third sub-index, and updating the association to comprise the third fingerprint value.

14. The non-transitory computer readable storage medium of claim 8, the method further comprising:

in response to one or more fingerprint values of the one or more fingerprint descriptors not being present in the fingerprint index, returning an indication that the one or more fingerprint values were not found, wherein the plurality of sub-indexes comprises the first sub-index, and each of the one or more fingerprint values is not present in a corresponding one of the plurality of sub-indexes.

15. An apparatus comprising:

a processor; and a memory coupled to the processor and configured to store instructions executable by the processor, the instructions configured to implement:

a service connection module configured to receive a lookup request, wherein the lookup request comprises one or more fingerprint descriptors, and each of the one or more fingerprint descriptors comprises a fingerprint value and a corresponding fingerprint type;

a request process module configured to identify a first fingerprint descriptor of the one or more fingerprint descriptors;

a lookup module configured to access a fingerprint index, wherein the fingerprint index comprises a plurality of sub-indexes, each sub-index is associated with a fingerprint type of a plurality of fingerprint types, the fingerprint index comprises association information, and the association information associates fingerprints of different fingerprint types that identify same data segments, select a first sub-index of the fingerprint index, wherein the first sub-index is associated with a first fingerprint type of the first fingerprint descriptor, and perform a lookup operation for a first fingerprint value of the first fingerprint descriptor, wherein the lookup operation is performed in the first sub-index; and a response generation module configured to return information associated with the first fingerprint value, in response to the first fingerprint value being present in the first sub-index.

16. The apparatus of claim 15, wherein the information comprises a segment descriptor, the segment descriptor comprises metadata that describes a segment stored in a deduplicated data store, and the first fingerprint value identifies the segment.

17. The apparatus of claim 15, wherein the information comprises a second fingerprint value of a second fingerprint type, the first fingerprint value and the second fingerprint value are associated with one another in the fingerprint index, and the first fingerprint value and the second fingerprint value identify a same segment.

18. The apparatus of claim 15, wherein the lookup module is further configured to
- identify a second fingerprint descriptor of the one or more fingerprint descriptors,
  - in response to the first fingerprint value not being present in the first sub-index,
- select a second sub-index of the fingerprint index, wherein the second sub-index is associated with a second fingerprint type of the second fingerprint descriptor, and
- perform a second lookup operation for a second fingerprint value of the second fingerprint descriptor, wherein
  - the second lookup operation is performed in the second sub-index, and
  - the first fingerprint value and the second fingerprint value identify a same segment.

19. The apparatus of claim 18, further comprising:
an insert module configured to
- insert the first fingerprint value into the first sub-index,
- insert the second fingerprint value into the second sub-index, and
- create an association in the fingerprint index, wherein the association comprises the first fingerprint value and the second fingerprint value.

20. The apparatus of claim 19, wherein
the insert module is further configured to
- insert a third fingerprint value into a third sub-index, in response to the third fingerprint value not being present in the third sub-index, and
- update the association to comprise the third fingerprint value.

21. The apparatus of claim 15, wherein
the lookup module is further configured to
- return an indication that one or more fingerprint values were not found, in response to the one or more fingerprint values of the one or more fingerprint descriptors not being present in the fingerprint index, wherein
  - the plurality of sub-indexes comprises the first sub-index, and
  - each of the one or more fingerprint values is not present in a corresponding one of the plurality of sub-indexes.

\* \* \* \* \*